(12) United States Patent
Uchida

(10) Patent No.: US 10,578,830 B2
(45) Date of Patent: Mar. 3, 2020

(54) IMAGING DEVICE, FOCUSING CONTROL METHOD, AND COMPUTER READABLE NON-TRANSITORY RECORDING MEDIUM

(71) Applicant: FUJIFILM Corporation, Tokyo (JP)

(72) Inventor: Akihiro Uchida, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/203,641

(22) Filed: Nov. 29, 2018

(65) Prior Publication Data

US 2019/0094487 A1    Mar. 28, 2019

Related U.S. Application Data

(63) Continuation of application No. PCT/JP2017/020474, filed on Jun. 1, 2017.

(30) Foreign Application Priority Data

Jun. 1, 2016 (JP) .................. 2016-110391

(51) Int. Cl.
*H04N 5/225* (2006.01)
*H04N 5/232* (2006.01)
*G02B 7/09* (2006.01)

(52) U.S. Cl.
CPC ............. *G02B 7/09* (2013.01); *H04N 5/2254* (2013.01); *H04N 5/23212* (2013.01)

(58) Field of Classification Search
CPC ... G02B 7/09; G02B 7/28; G02B 7/34; G02B 7/36; H04N 5/2254; H04N 5/23212; H04N 5/36961; H04N 5/232; G03B 13/36
See application file for complete search history.

(56) References Cited

U.S. PATENT DOCUMENTS

2004/0202461 A1 * 10/2004 Nakahara ............... G02B 7/285
396/104

2007/0122137 A1    8/2007 Ohnishi
(Continued)

FOREIGN PATENT DOCUMENTS

JP    2006350188    12/2006
JP    2007179029    7/2007
(Continued)

OTHER PUBLICATIONS

"International Search Report (Form PCT/ISA/210) of PCT/JP2017/020474," dated Aug. 22, 2017, with English translation thereof, pp. 1-5.
(Continued)

*Primary Examiner* — Hung H Lam
(74) *Attorney, Agent, or Firm* — JCIPRNET

(57) ABSTRACT

There are provided an imaging device, a focusing control method, and a focusing control program which are capable of realizing focusing control at a high speed with high accuracy. A digital camera includes an imaging element 5 that has pixels including phase-difference detecting pixels 52A and 52B and images a subject through an imaging optical system including a focus lens, and a system controller 11 that selectively performs focusing control using a phase difference AF method or focusing control using a contrast AF method in a mode in which focusing control for focusing on a main subject by driving the focus lens is continuously performed multiple times. The system controller 11 performs the focusing control using the contrast AF method in a case where a state in which a degree of reliability of the focusing control using the phase difference AF method is equal to or less than a threshold value persists N times (N is a natural number of 2 or more) while the focusing control using the phase difference AF method is continuously performed.

20 Claims, 17 Drawing Sheets

(56) References Cited

U.S. PATENT DOCUMENTS

| | | | | |
|---|---|---|---|---|
| 2013/0335614 A1* | 12/2013 | Ichimiya | ............... | G02B 7/346 |
| | | | | 348/333.11 |
| 2014/0016021 A1* | 1/2014 | Uchida | ................. | G03B 13/36 |
| | | | | 348/353 |
| 2014/0347549 A1* | 11/2014 | Nakamoto | ............... | G02B 7/36 |
| | | | | 348/349 |
| 2016/0080634 A1* | 3/2016 | Hamano | ................ | G02B 7/365 |
| | | | | 348/349 |
| 2016/0127637 A1* | 5/2016 | Takao | .................... | G02B 7/365 |
| | | | | 348/208.12 |
| 2016/0205315 A1* | 7/2016 | Irie | .......................... | G02B 7/28 |
| | | | | 348/353 |
| 2017/0318217 A1 | 11/2017 | Takao et al. | | |

FOREIGN PATENT DOCUMENTS

| | | |
|---|---|---|
| JP | 2011215482 | 10/2011 |
| JP | 2013003486 | 1/2013 |
| JP | 2013041075 | 2/2013 |
| JP | 2014149540 | 8/2014 |
| JP | 2015087558 | 5/2015 |
| JP | 2016090816 | 5/2016 |
| WO | 2015045704 | 4/2015 |

OTHER PUBLICATIONS

"Written Opinion of the International Searching Authority (Form PCT/ISA/237) of PCT/JP2017/020474," dated Aug. 22, 2017, with English translation thereof, pp. 1-10.

\* cited by examiner

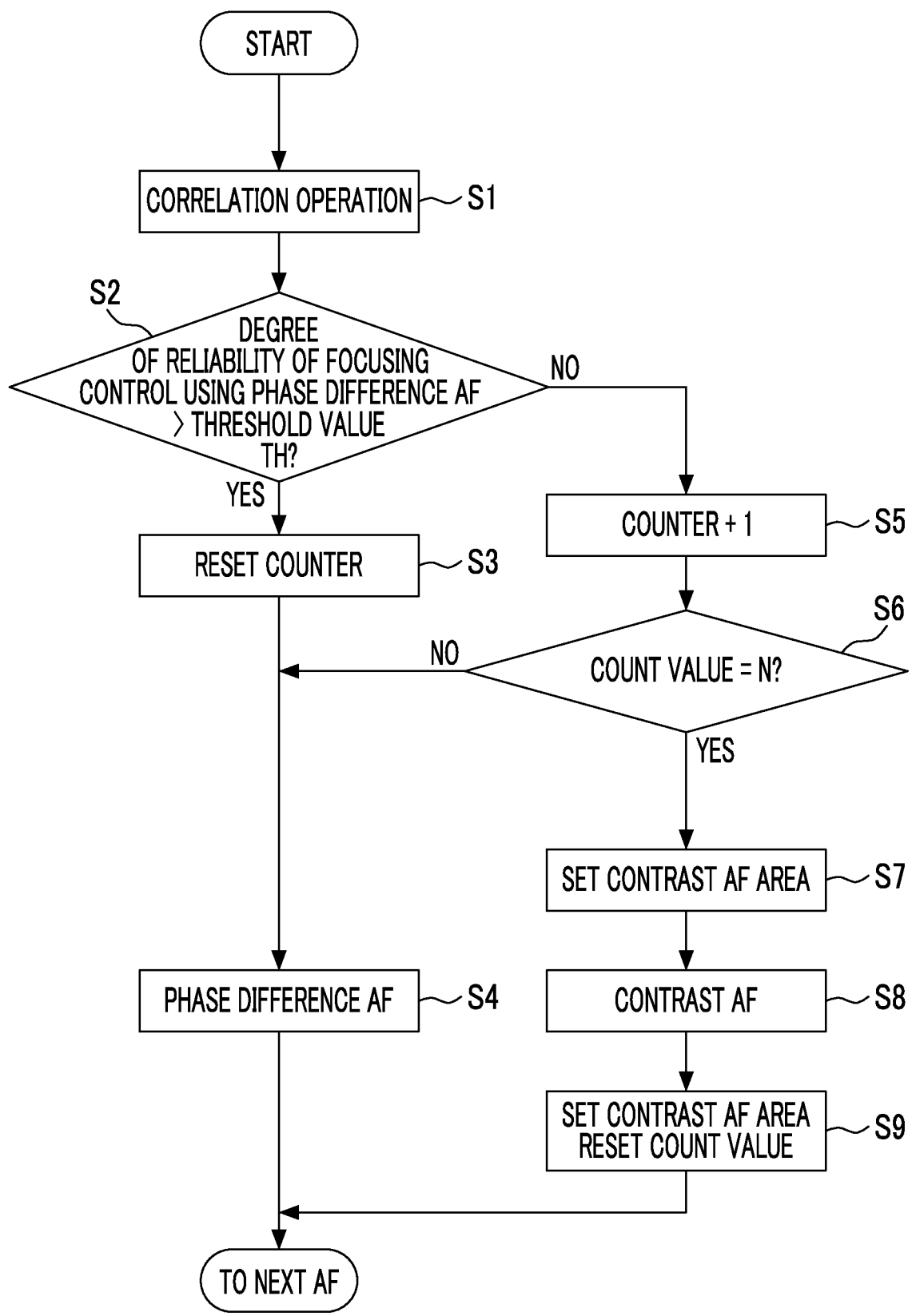

IMAGING DEVICE, FOCUSING CONTROL METHOD, AND COMPUTER READABLE NON-TRANSITORY RECORDING MEDIUM

CROSS REFERENCE TO RELATED APPLICATION

This is a continuation of International Application No. PCT/JP2017/020474 filed on Jun. 1, 2017, and claims priority from Japanese Patent Application No. 2016-110391 filed on Jun. 1, 2016, the entire disclosures of which are incorporated herein by reference.

BACKGROUND OF THE INVENTION

1. Field of the Invention

The present invention relates to an imaging device, a focusing control method, and a computer readable medium storing a focusing control program.

2. Description of the Related Art

In recent years, with an increase in resolution of imaging elements, such as a charge coupled device (CCD) image sensor and a complementary metal oxide semiconductor (CMOS) image sensor, there is a rapid increase in demand for information devices having an imaging function, such as a digital still camera, a digital video camera, and a smartphone. The information devices having an imaging function described above are referred to as imaging devices.

In these imaging devices, a contrast auto focus (AF) method is employed as a focusing control method of focusing on a main subject.

JP2011-215482A and JP2014-149540A describe an imaging device that performs focusing control by using the contrast AF method.

JP2013-041075A describes an imaging device that performs the focusing control using the contrast AF method in a case where a defocus value calculated by a phase difference AF method is equal to or less than a threshold value.

JP2006-350188A describes an imaging device that performs the focusing control by using the phase difference AF method until a subject enters within a depth of field and then performs the focusing control using the contrast AF method.

JP2007-179029A describes an imaging device capable of setting a mode in which the focusing control using the phase difference AF method is performed and a mode in which focusing control in which the phase difference AF method and the contrast AF method are combined or the focusing control using the contrast AF method is selectively performed.

SUMMARY OF THE INVENTION

Since the phase difference AF method and the contrast AF method have advantages and disadvantages, it is possible to improve focusing accuracy by distinguishing between the phase difference AF method and the contrast AF method.

Since the imaging device described in JP2011-215482A and JP2014-149540A performs the focusing control by using only the contrast AF method, the focusing accuracy deteriorates in a case where a subject inappropriate for the contrast AF method is captured. Such an imaging device is not appropriate for a case where the imaging device continues to focus on a subject moving at a high speed.

Since the imaging device described in JP2013-041075A and JP2006-350188A performs the focusing control in which the phase difference AF method and the contrast AF method are combined, a time until AF is completed becomes long as compared to a case where the focusing control is performed by using only the phase difference AF method. Thus, such an imaging device is not appropriate for a case where the imaging device continues to focus on a subject moving at a high speed.

In the imaging device described in JP2007-17929A, in a case where the mode in which the focusing control using the contrast AF method or the focusing control in which the contrast AF method and the phase difference AF method are combined is selectively performed is set, the focusing accuracy deteriorates in an imaging scene in which the imaging device continues to focus on the subject moving at a high speed. In a case where the mode in which the focusing control using the phase difference AF method is performed is set, the focusing accuracy deteriorates in a case where the subject inappropriate for the phase difference AF method is captured.

The present invention has been made in view of the circumstances, and an object of the present invention is to provide an imaging device, a focusing control method, and a focusing control program which are capable of realizing focusing control at a high speed with high accuracy.

An imaging device according to the present invention comprises an imaging element that images a subject through an imaging optical system including a focus lens, first signal detection parts that detect signals corresponding to one of a pair of luminous fluxes passed through different portions of a pupil area of the imaging optical system, second signal detection parts that detect signals corresponding to the other one of the pair of luminous fluxes, and a focusing controller that selectively performs focusing control using a phase difference AF method using a result of a correlation operation of detection signals of the first signal detection parts and detection signals of the second signal detection parts or focusing control using a contrast AF method using contrast of a captured image captured by the imaging element in a mode in which focusing control for focusing on a main subject by driving the focus lens is continuously performed multiple times. The focusing controller performs the focusing control using the contrast AF method in a case where a state in which a degree of reliability of the focusing control using the phase difference AF method is equal to or less than a threshold value persists N times, N being a natural number of 2 or more, while the focusing control using the phase difference AF method is continuously performed.

A focusing control method according to the present invention comprises a focusing control step of selectively performing focusing control using a phase difference AF method using a result of a correlation operation of detection signals of first signal detection parts that detect signals corresponding to one of a pair of luminous fluxes passed through different portions of a pupil area of an imaging optical system and detection signals of second signal detection parts that detect signals corresponding to the other one of the pair of luminous fluxes or focusing control using a contrast AF method using contrast of a captured image captured by an imaging element that images a subject through the imaging optical system, in a case where focusing control for focusing on a main subject by driving a focus lens of the imaging optical system including the focus lens is continuously performed multiple times. In the focusing control step, the focusing control using the contrast AF method is performed in a case where a state in which a degree of reliability of the focusing control using the phase difference AF method is equal to or less than a threshold value persists N times, N being a natural number of 2 or more, while the focusing control using the phase difference AF method is continuously performed.

A focusing control program according to the present invention causes a computer to perform a focusing control step of selectively performing focusing control using a phase difference AF method using a result of a correlation operation of detection signals of first signal detection parts that detect signals corresponding to one of pair of luminous fluxes passed through different portions of a pupil area of an imaging optical system and detection signals of second signal detection parts that detect signals corresponding to the other one of the pair of luminous fluxes or focusing control using a contrast AF method using contrast of a captured image captured by an imaging element that images a subject through the imaging optical system, in a case where focusing control for focusing on a main subject by driving a focus lens of the imaging optical system including the focus lens is continuously performed multiple times. In the focusing control step, the focusing control using the contrast AF method is performed in a case where a state in which a degree of reliability of the focusing control using the phase difference AF method is equal to or less than a threshold value persists N times, N being a natural number of 2 or more, while the focusing control using the phase difference AF method is continuously performed.

According to the present invention, it is possible to provide an imaging device, a focusing control method, and a focusing control program which are capable of realizing focusing control at a high speed with high accuracy.

BRIEF DESCRIPTION OF THE DRAWINGS

FIG. 7 is a flowchart for describing an operation of the digital camera shown in FIG. 1 in a continuous AF mode.

DESCRIPTION OF THE PREFERRED EMBODIMENTS

Hereinafter, an embodiment of the present invention will be described with reference to the drawings.

Figure 1:
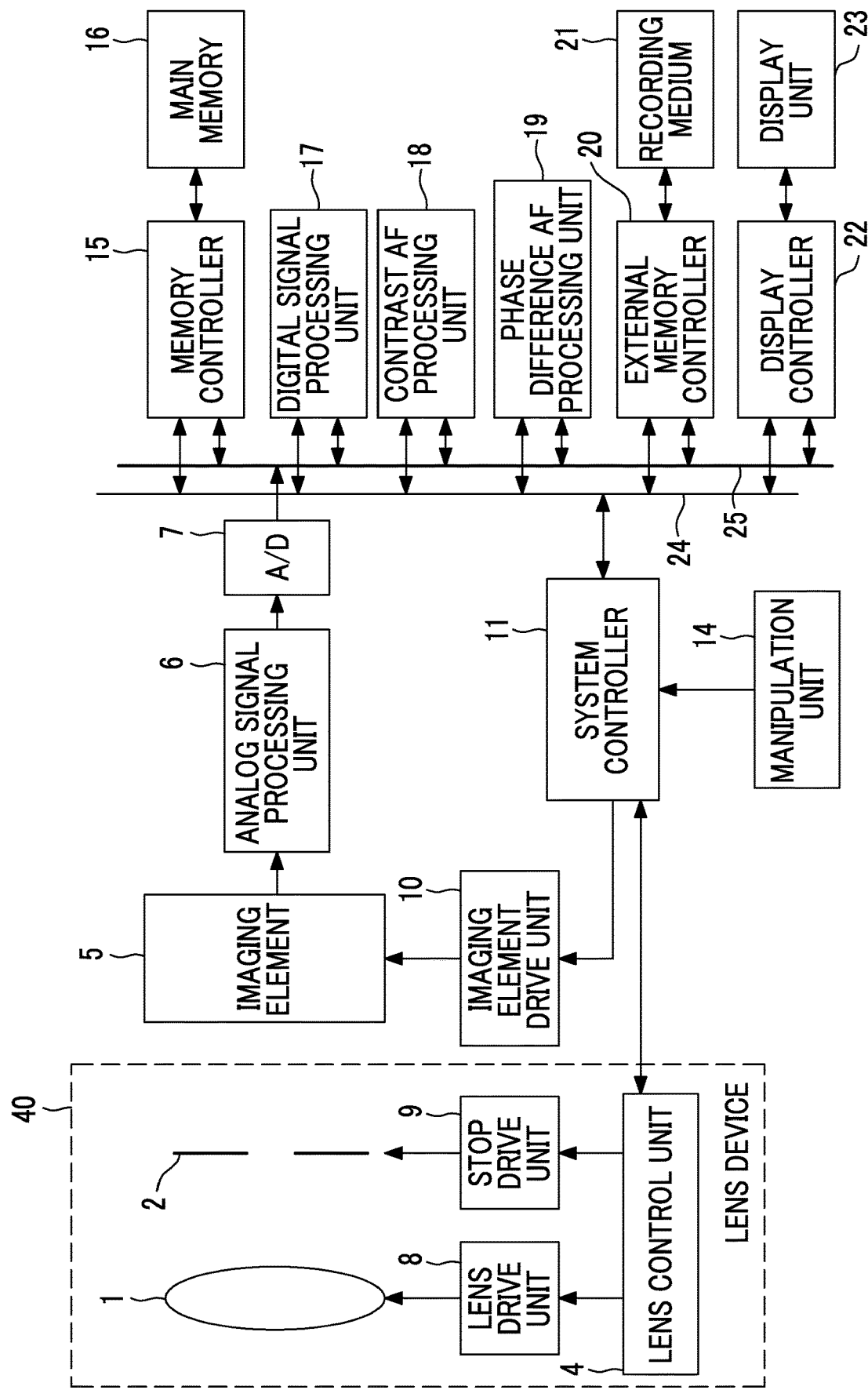
FIG. 1 is a diagram showing a schematic configuration of a digital camera which is an embodiment of an imaging device according to the present invention.

FIG. 1 is a diagram showing a schematic configuration of a digital camera which is an embodiment of an imaging device according to the present invention.

The digital camera shown in FIG. 1 comprises a lens device 40 that includes an imaging lens 1, a stop 2, a lens controller 4, a lens drive unit 8, and a stop drive unit 9.

In the present embodiment, the lens device 40 may be attachably and detachably provided on a digital camera main body, or may be fixed to the digital camera main body.

The imaging lens 1 and the stop 2 constitute an imaging optical system, and the imaging optical system includes at least a focus lens. The focus lens is a lens for adjusting a focus position of the imaging optical system, and is composed of a single lens or a plurality of lenses. The focus lens moves in an optical axis direction of the imaging optical system, and thus, the focus position is adjusted.

A liquid lens capable of changing a focus position by performing variable control on a curved surface of the lens may be used as the focus lens.

The lens controller 4 of the lens device 40 can communicate with a system controller 11 of the digital camera main body in a wired or wireless manner.

The lens controller 4 drives the focus lens included in the imaging lens 1 through the lens drive unit 8 or drives the stop 2 through the stop drive unit 9 according to a command from the system controller 11.

The digital camera main body comprises an imaging element 5 that images subjects through the imaging optical system, such as a CCD image sensor or a CMOS image sensor, an analog signal processing unit 6 that is connected to an output of the imaging element 5 to perform analog signal processing such as sampling two correlation pile processing, an analog-to-digital conversion circuit 7 that converts analog signals output from the analog signal processing unit 6 into digital signals, an imaging element drive unit 10, the system controller 11 that generally controls the entire system, and a manipulation unit 14.

The analog signal processing unit 6, the analog-to-digital conversion circuit 7, and the imaging element drive unit 10 are controlled by the system controller 11.

The system controller 11 drives the imaging element 5 through an imaging element drive unit 10, and outputs, as a captured image signal, a subject image captured through the imaging optical system. A command signal from a user is input to the system controller 11 through a manipulation unit 14.

The system controller 11 includes various processors and memories such as a random access memory (RAM) and a read only memory (ROM).

The various processors include a central processing unit (CPU) which is a general-purpose processor that performs various processing, a programmable logic device (PLD) which is a processor capable of changing a circuit configuration after a field-programmable gate array is manufactured, and a dedicated electric circuit which is a processor having a dedicated circuit configuration designed for performing a specific process such as an Application-Specific Integrated Circuit (ASIC).

More specifically, the structures of the various processors are electric circuits obtained by combining circuit elements such as semiconductor devices.

The system controller 11 may be constituted by one of the various processors, or may be constituted by a combination (for example, a combination of a plurality of FPGAs or a combination of the CPU and the FPGA) of two or more processors of the same type or different types.

The system controller 11 realizes functions to be described below by executing programs including a focusing control program stored in a built-in ROM.

The electric control system of the digital camera further comprises a main memory 16, a memory controller 15 that is connected to the main memory 16, a digital signal processing unit 17 that generates captured image data by performing signal processing on the captured image signal output from the analog-to-digital conversion circuit 7, a contrast AF processing unit 18 that determines a focusing position by a contrast AF method, a phase difference AF processing unit 19 that calculates a defocus value by a phase difference AF method, an external memory controller 20 to which an attachable and detachable recording medium 21 is connected, and a display controller 22 to which a display unit 23 mounted on a camera rear surface is connected.

The memory controller 15, the digital signal processing unit 17, the contrast AF processing unit 18, the phase difference AF processing unit 19, the external memory controller 20, and the display controller 22 are connected to each other through a control bus 24 and a data bus 25, and are controlled according to a command from the system controller 11. The contrast AF processing unit 18 and the phase difference AF processing unit 19 are function blocks formed by cooperating with various hardware by the focusing control program being executed by the processor of the system controller 11.

Figure 2:
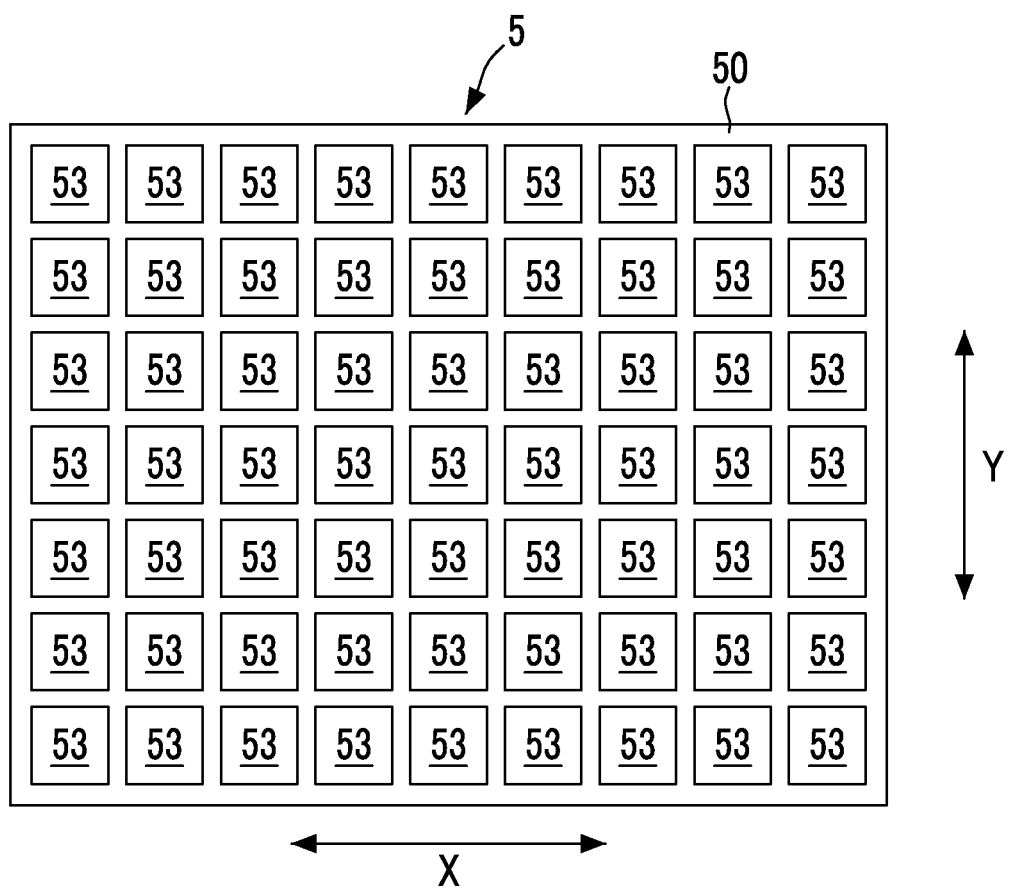
FIG. 2 is a planar schematic diagram showing a configuration of an imaging element 5 mounted on the digital camera shown in FIG. 1.

FIG. 2 is a planar schematic diagram showing a configuration of the imaging element 5 mounted on the digital camera shown in FIG. 1.

The imaging element 5 has a light receiving surface 50 on which a plurality of pixels arranged in two dimensions in a row direction X and a column direction Y perpendicular to the row direction X.

In the example of FIG. 2, 63 focus detection areas (hereinafter, referred to as AF areas) 53 which are areas to be in focus (areas in which a subject image to be in focus is formed) are formed on the light receiving surface 50.

In the digital camera shown in FIG. 1, focusing control for selecting one pixel or a plurality of consecutively arranged pixels among the 63 AF areas 53 shown in FIG. 2 and focusing on subjects to be captured by the selected AF area 53 is performed.

The AF area 53 is an area that includes imaging pixels and phase-difference detecting pixels, as pixels. Only the imaging pixels are arranged in a portion of the light receiving surface 50 except for the AF areas 53.

Figure 3:
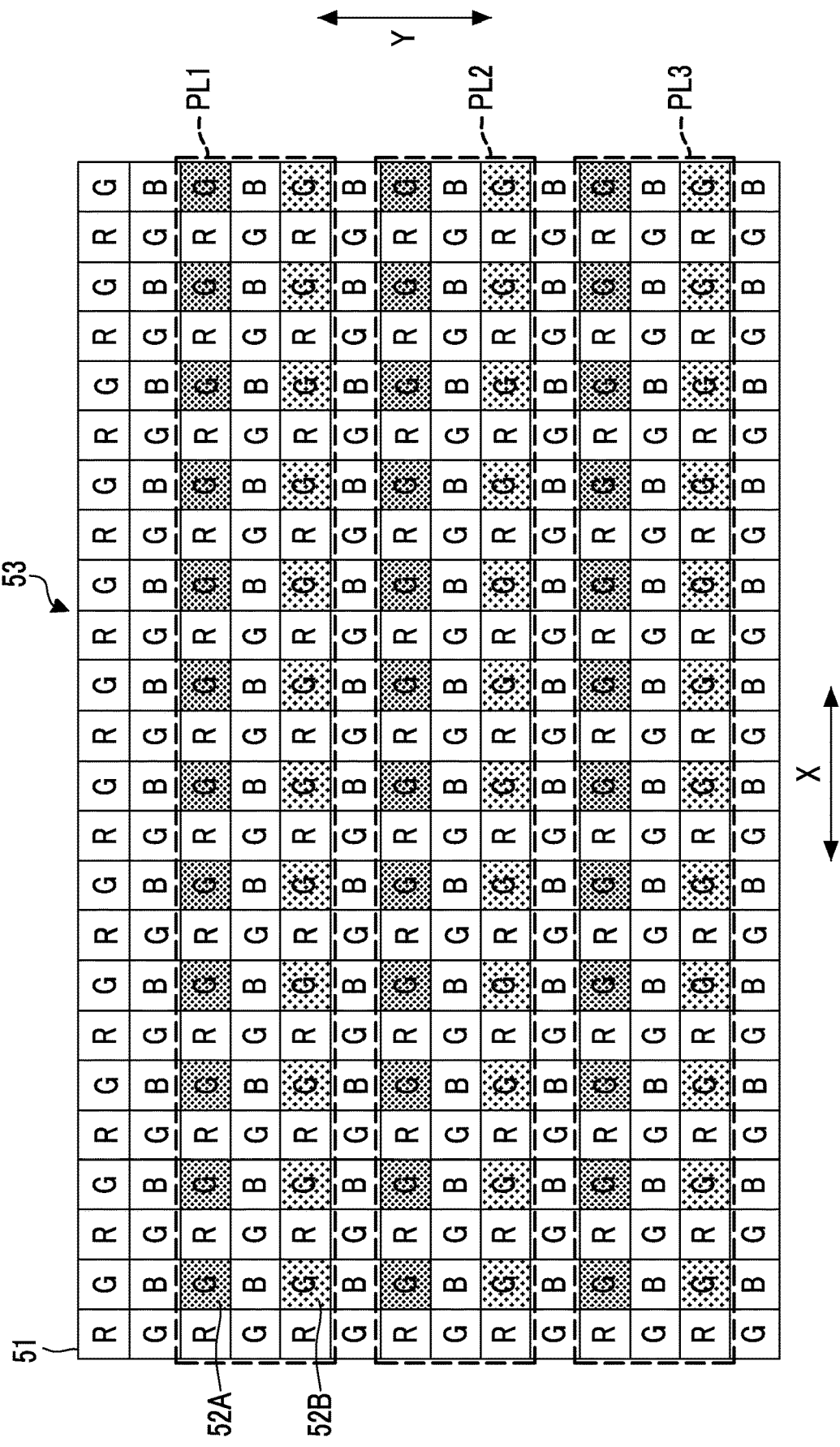
FIG. 3 is a partial enlarged view of one AF area 53 shown in FIG. 2.

FIG. 3 is a partial enlarged view of one AF area 53 shown in FIG. 2.

Pixels 51 (square blocks in FIG. 3) are arranged in two dimensions in the AF area 53. Each pixel 51 includes a photoelectric conversion unit such as a photodiode and a color filter formed above the photoelectric conversion unit. Each pixel 51 may separate light depending on a structure of the photodiode without using the color filter.

In FIG. 3, the pixel 51 (R pixels 51) including a color filter (R filter) transmitting red light is assigned a character of "R".

In FIG. 3, the pixel 51 (G pixel 51) including a color filter (G filter) transmitting green light is assigned a character of "G".

In FIG. 3, the pixel 51 (B pixel 51) including a color filter (B filter) transmitting blue light is assigned a character of "B". The arrangement of the color filters is a Bayer array on the entire light receiving surface 50.

In the AF area 53, some (hatched pixels in FIG. 3) of the G pixels 51 are phase-difference detecting pixels 52A and 52B. In the example of FIG. 3, the G pixels 51 in any pixel row among pixel rows each including the R pixels 51 and the G pixels 51 are the phase-difference detecting pixels 52A, and the G pixels 51 having the same color which are closest to the G pixels 51 serving as the phase-difference detecting pixels 52A in the column direction Y are the phase-difference detecting pixels 52B.

The phase-difference detecting pixel 52A and the phase-difference detecting pixel 52B having the same color which is closest to the phase-difference detecting pixel 52A in the column direction Y are paired.

A pair row PL1 constituted by a plurality of pairs arranged in the row direction X is constituted by the phase-difference detecting pixels 52A present in the third pixel row from the top in FIG. 3 and the phase-difference detecting pixels 52B present in the fifth pixel row from the top in FIG. 3.

A pair row PL2 constituted by a plurality of pairs arranged in the row direction X is constituted by the phase-difference detecting pixels 52A present in the seventh pixel row from the top in FIG. 3 and the phase-difference detecting pixels 52B present in the ninth pixel row from the top in FIG. 3.

A pair row PL3 constituted by a plurality of pairs arranged in the row direction X is constituted by the phase-difference detecting pixels 52A present in the eleventh pixel row from the top in FIG. 3 and the phase-difference detecting pixels 52B present in the thirteenth pixel row from the top in FIG. 3.

As stated above, the plurality of pair rows are arranged in the column direction Y in the AF area 53.

Figure 4:
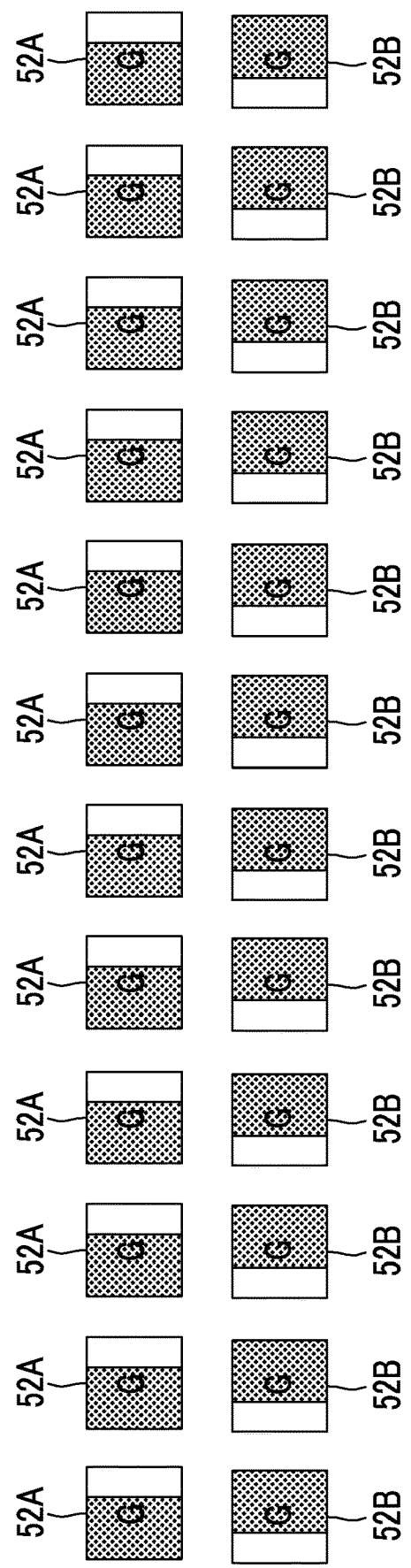
FIG. 4 is a diagram showing phase-difference detecting pixels constituting any pair row shown in FIG. 3.

FIG. 4 is a diagram showing the phase-difference detecting pixels constituting any pair row shown in FIG. 3.

The phase-difference detecting pixels 52A are first signal detection parts that receive luminous flux passed through one division area obtained by dividing a pupil area of the imaging lens 1 into two divisions in the row direction X and detect signals corresponding to light reception amounts.

The phase-difference detecting pixels 52B are second signal detection parts that receive luminous flux passed through the other division area of the pupil area and detect signals corresponding to light reception amounts.

In the AF area 53, the plurality of pixels 51 other than the phase-difference detecting pixels 52A and 52B is the imaging pixels. The imaging pixels receive luminous flux passed through both the two division areas of the pupil area of the imaging lens 1, and detect signals corresponding to light reception amounts.

A light shielding film is formed above the photoelectric conversion unit of each pixel 51, and an opening that defines a light reception area of the photoelectric conversion unit is formed in the light shielding film.

A center of the opening of the imaging pixel matches a center of the photoelectric conversion unit of the imaging pixel. In contrast, a center of an opening (a white portion of FIG. 4) of the phase-difference detecting pixel 52A is eccentric to the right side with respect to a center of the photoelectric conversion unit of the phase-difference detecting pixel 52A.

A center of an opening (a white portion of FIG. 4) of the phase-difference detecting pixel 52B is eccentric to the left side with respect to a center of the photoelectric conversion unit of the phase-difference detecting pixel 52B.

Figure 5:
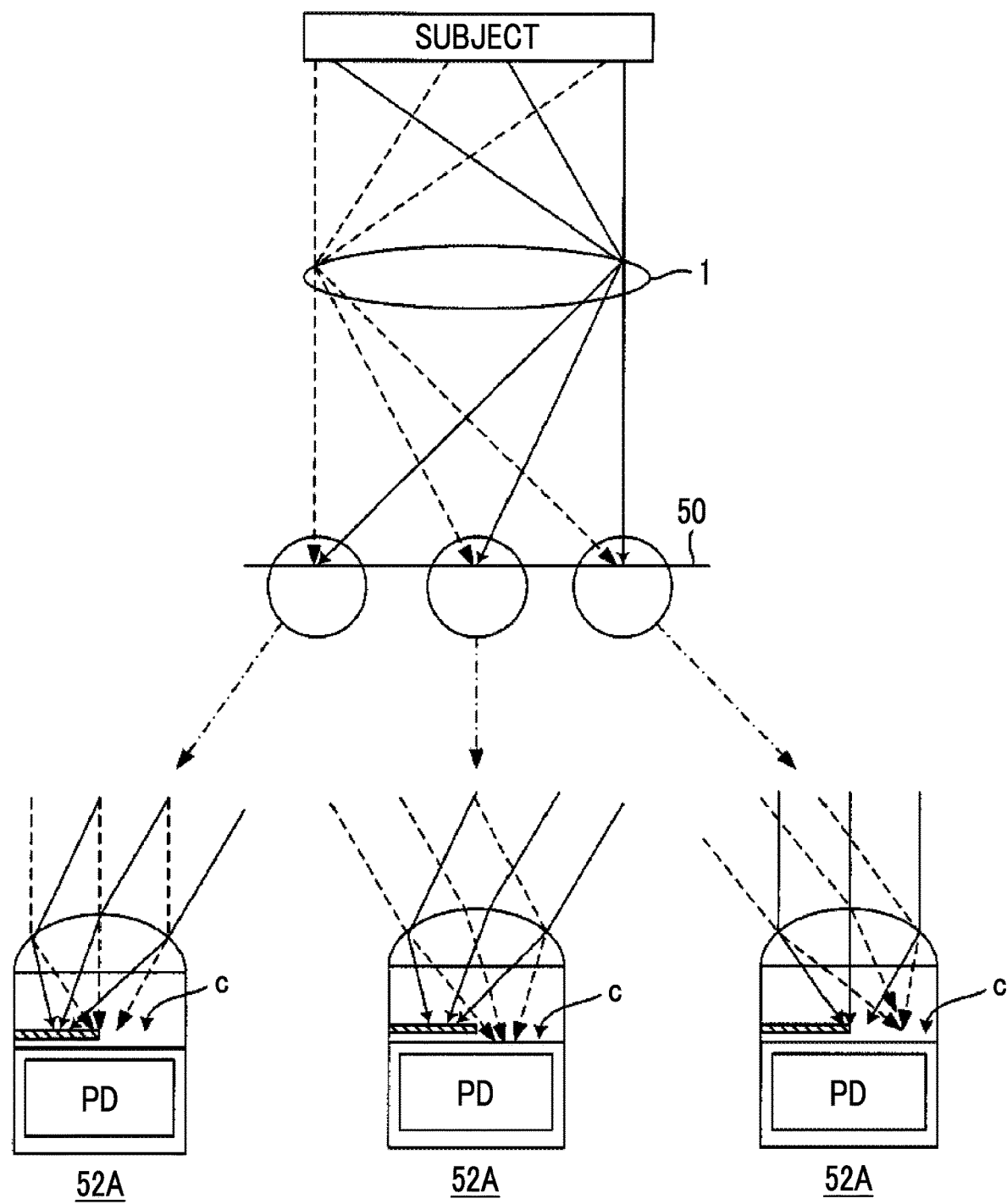
FIG. 5 is a diagram showing a cross-sectional configuration of phase-difference detecting pixel 52A.

FIG. 5 is a diagram showing a cross-sectional configuration of the phase-difference detecting pixel 52A. As shown in FIG. 5, an opening c of the phase-difference detecting pixel 52A is eccentric to the right with respect to a photoelectric conversion unit PD.

As shown in FIG. 5, one side of the photoelectric conversion unit PD is covered by the light shielding film, and thus, it is possible to selectively shield light rays incident in a direction opposite to a direction covered by the light shielding film.

With such a configuration, it is possible to detect a phase difference in the row direction X on images captured by each of two pixel groups such as a pixel group including the phase-difference detecting pixels 52A constituting any pair row and a pixel group including the phase-difference detecting pixels 52B constituting the pair row.

The pixel configuration of the imaging element 5 is not limited to the configuration shown in FIGS. 2 to 5.

For example, all the pixels included in the imaging element 5 may be the imaging pixels, one division portion obtained by dividing each imaging pixel into two in the row direction X may be the phase-difference detecting pixel 52A, and the other division portion may be the phase-difference detecting pixel 52B.

Figure 6:
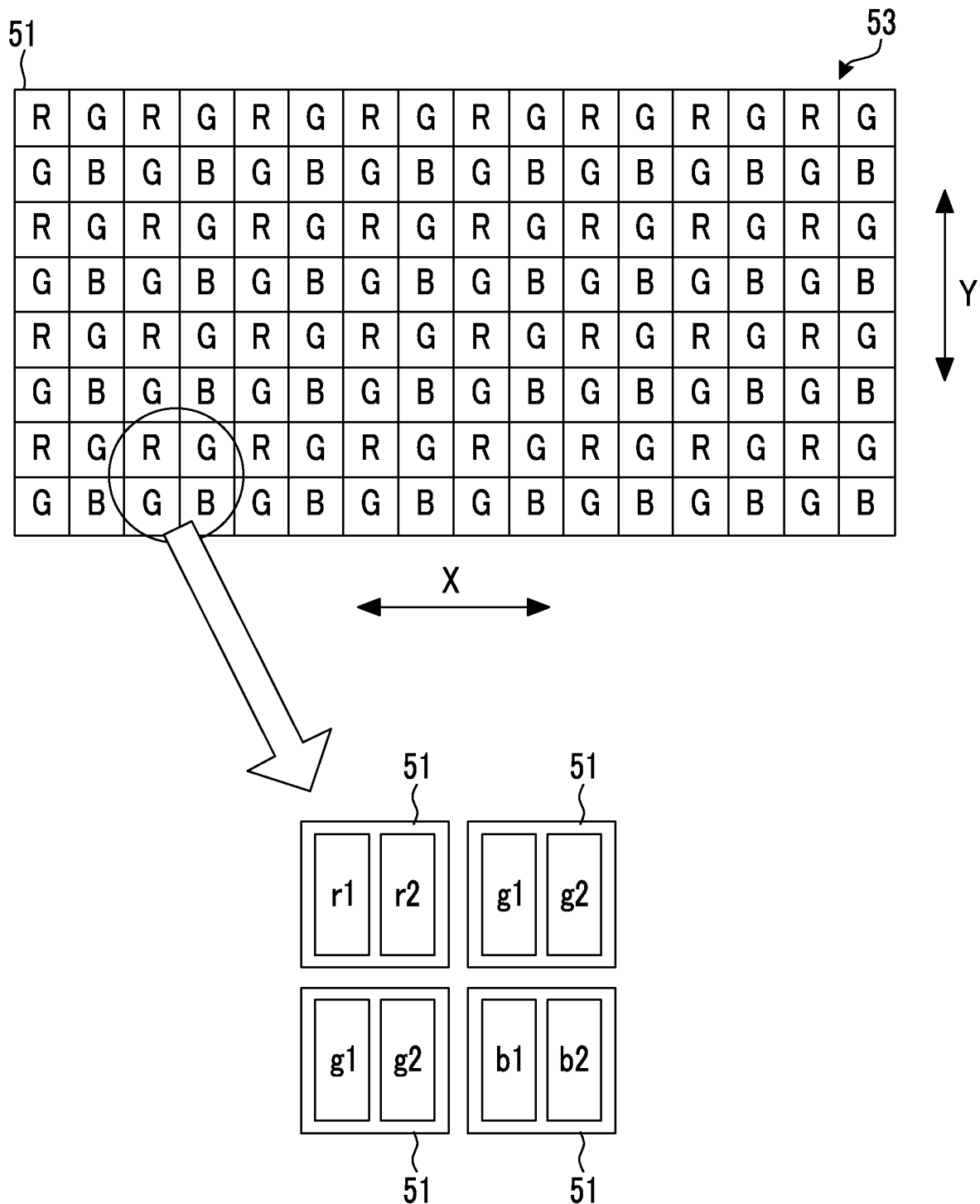
FIG. 6 is a diagram showing a configuration in which all pixels included in the imaging element 5 are imaging pixels and each imaging pixel is divided into two.

FIG. 6 is a diagram showing a configuration in which all the pixels 51 included in the imaging element 5 are the imaging pixels and each pixel 51 is divided into two.

In the configuration of FIG. 6, in the imaging element 5, the pixel 51 assigned R is divided into two, and two divided portions are respectively a phase-difference detecting pixel r1 and a phase-difference detecting pixel r2.

in the imaging element 5, the pixel 51 assigned G is divided into two, and two divided portions are respectively a phase-difference detecting pixel g1 and a phase-difference detecting pixel g2.

in the imaging element 5, the pixel 51 assigned B is divided into two, and two divided portions are respectively a phase-difference detecting pixel b1 and a phase-difference detecting pixel b2.

In this configuration, the phase-difference detecting pixels r1, g1, and b1 are first signal detection parts, and the phase-difference detecting pixels r2, g2, and b2 are second signal detection parts. Two phase-difference detecting pixels included in one pixel 51 constitute a pair.

In the configuration example of FIG. 6, in a case where the signals of the first signal detection part and the second signal detection part included in one pixel 51 are added, a normal imaging signal with no phase difference is obtained. That is, in the configuration of FIG. 6, all the pixels may be used as both of the phase-difference detecting pixels and the imaging pixels. In the configuration example of FIG. 6, it is possible to improve a degree of freedom in setting of the size and shape of the AF area.

The system controller 11 selectively performs the focusing control using the phase difference AF method or the focusing control using the contrast AF method. The system controller 11 constitutes a focusing controller.

According to a command of the system controller 11, the phase difference AF processing unit 19 calculates a phase difference which is a relative positional deviation amount of the two images formed by the pair of luminous fluxes by using a detection signal group read out from the phase-difference detecting pixels 52A and the phase-difference detecting pixels 52B present in one AF area or the plurality of AF areas 53 (hereinafter, referred to as phase difference AF areas) selected by a user's manipulation among the 63 AF areas 53. The phase difference AF area constitute a second subject area.

The phase difference AF processing unit 19 obtains an amount separated from a focus adjustment state of the imaging lens 1, for example, a focusing state and a direction separated from the focusing state, that is, a defocus value based on the phase difference.

The system controller 11 performs the focusing control using the phase difference AF method using the result of a correlation operation by driving the focus lens based on the defocus value.

The contrast AF processing unit 18 analyzes a captured image to be captured by the imaging element 5, and determines the focusing position of the imaging lens 1 by the contrast AF method.

That is, the contrast AF processing unit 18 obtains contrast (a difference in brightness) of the captured image obtained for each of moved positions (a plurality of positions) while moving the focus lens position of the imaging lens 1 under the control of the system controller 11. The focus lens position in which contrast is maximum is determined as the focusing position.

The system controller 11 performs the focusing control using the contrast AF method using the contrast of the captured image by driving the focus lens based on the focusing position determined by the contrast AF processing unit 18.

The digital camera having the configuration described above is provided with a continuous AF mode in which the focusing control for focusing on a main subject is continuously performed multiple times. Hereinafter, an operation of the digital camera in the continuous AF mode will be described.

FIG. 7 is a flowchart for describing the operation of the digital camera shown in FIG. 1 in the continuous AF mode.

Initially, the manipulation unit 14 is manipulated in a state in which any area (hereinafter, one AF area 53 is used) is selected by a user of the digital camera among the 63 AF areas 53, and a command to perform AF is performed.

According to the command, the phase difference AF processing unit 19 calculates, for example, a correlation value by performing a correlation operation of an average value of the detection signals of the phase-difference detecting pixels 52A of which the positions in the row direction X are the same, which are included in all the pair rows included in the phase difference AF area and an average value of the detection signals of the phase-difference detecting pixels 52B of which the positions in the row direction X are the same, which are included in all the pair rows, calculates a phase difference based on the correlation value, and calculates a defocus value based on the phase difference (step S1).

Subsequently, the system controller 11 determines a degree of reliability of the defocus value calculated in step S1, that is, a degree of reliability of the focusing control using the phase difference AF method (step S2).

For example, in a graph in which a vertical axis represents the correlation value calculated in step S1 and a vertical axis represents a deviation amount between two detection signal groups as targets for which the correlation value is obtained in the row direction X, the system controller 11 determines that the degree of reliability of the focusing control using the phase difference AF method is equal to or less than a threshold value TH in a case where there is a plurality of minimum points or a case where there is no minimum point.

Meanwhile, in a case where there is only one minimum point in the graph and the correlation value at the minimum point is smaller than a predetermined value, the system controller 11 determines that the degree of reliability of the focusing control using the phase difference AF method exceeds the threshold value TH. Another known method may be employed as the method of determining the degree of reliability.

In a case where the degree of reliability of the focusing control using the phase difference AF method exceeds the threshold value TH (step S2: YES), the system controller 11 resets a count value of a built-in counter to an initial value (=0) (step S3).

The system controller 11 moves the focus lens to the focusing position by driving the focus lens (by performing the focusing control using the phase difference AF method) based on the defocus value calculated in step S1 (step S4).

The system controller 11 returns the processing to step S1 after the focusing control using the phase difference AF method is ended, and performs an operation for the next AF.

In a case where it is determined that the degree of reliability of the focusing control using the phase difference AF method is equal to or less than the threshold value TH (step S2: NO), the system controller 11 increases the count value of the built-in counter by one (step S5), and then determines whether or the count value reaches N (step S6). N is any natural value of 2 or more.

In a case where the count value does not reach N (step S6: NO), the system controller 11 performs the processing of step S4.

In a case where the count value reaches N (step S6: YES), the system controller 11 sets a contrast AF area which is an area in which subjects to be in focus in a case where the focusing control using the contrast AF method is formed based on the phase difference AF area (step S7).

The contrast AF area constitutes a first subject area.

Figure 8A:
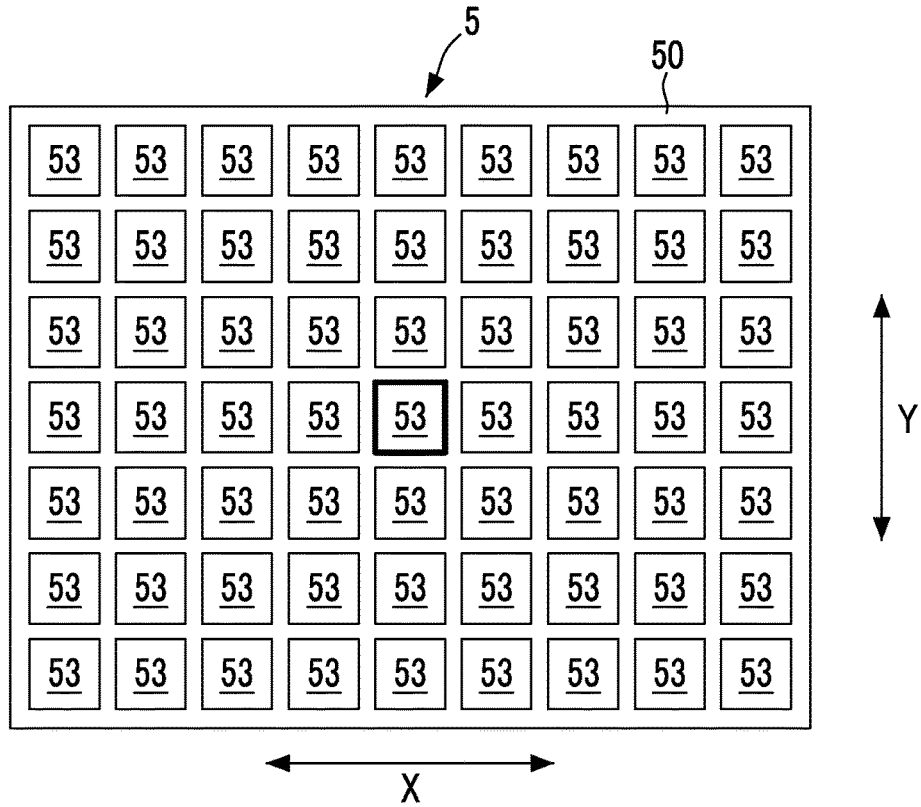
FIGS. 8A and 8B are schematic diagrams for describing a setting example of a contrast AF area.
Figure 8B:
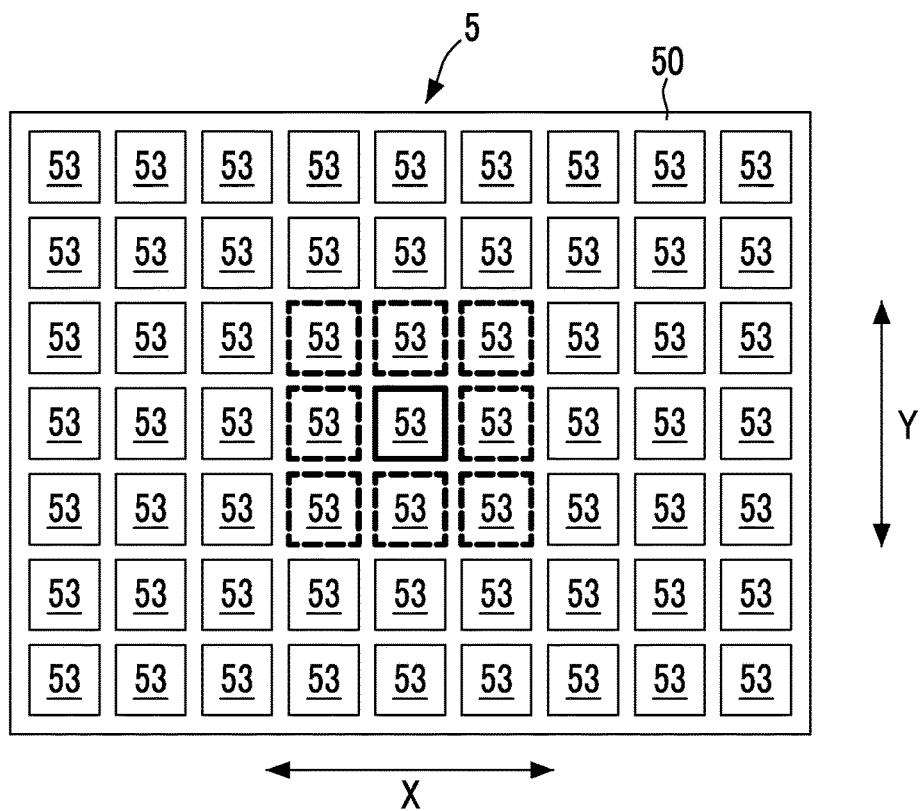

FIGS. 8A and 8B are schematic diagrams for describing a setting example of the contrast AF area.

For example, it is assumed that the phase difference AF area is the AF area 53 (surrounded by a thick frame in FIG. 8A) present in the center among the 63 AF areas 53, as shown in FIG. 8A.

In this case, in step S7, the system controller 11 sets, as the contrast AF area, an area (an area including nine AF areas 53 and spacings between these nine AF areas 53) surrounded by nine AF areas 53 including the central AF area 53 and eight AF areas 53 (surrounded by dashed frames in FIG. 8B) present near the central AF area 53, as shown in FIG. 8B.

The contrast AF area may be an area that includes the phase difference AF area and is larger than the phase difference AF area, and is not limited to the setting example shown in FIGS. 8A and 8B.

After step S7, the contrast AF processing unit 18 determines the focusing position based on the contrast of a captured image to be captured by the contrast AF area. The system controller 11 performs the focusing control using the contrast AF method by moving the focus lens to the focusing position (step S8).

After the focusing control using the contrast AF method is performed, the system controller 11 resets the setting of the contrast AF area and the count value of the built-in counter (step S9). Thereafter, the system controller returns the processing to step S1, and then performs an operation for the next AF.

As described above, according to the digital camera shown in FIG. 1, the focusing control using the phase difference AF method is continuously performed in a state in which the degree of reliability of the focusing control using the phase difference AF method exceeds to the threshold value TH. Thus, it is possible to continue to focus on even a subject moving at a high speed.

Meanwhile, even though the degree of reliability of the focusing control using the phase difference AF method is equal to or less than the threshold value TH, in a case where this state does not persist N times, the focusing control using the phase difference AF method is continuously performed. Thus, it is possible to continue to focus on even a subject moving at a high speed. The focusing control using the phase difference AF method has a low possibility that the imaging lens will be greatly deviated from the focusing state (large blurriness occurs) even though the imaging is performed in a state in which the degree of reliability is low. Accordingly, it is possible to maintain a balance between the followability to the subject and the focusing accuracy.

According to the digital camera shown in FIG. 1, in the continuous AF mode, in a case where the state in which the degree of reliability of the focusing control using the phase difference AF method is equal to or less than the threshold value TH persists N times, the focusing control using the contrast AF method is performed for the first time.

As stated above, it is possible to maintain the balance between the followability to the subject and the focusing accuracy by performing the focusing control using the contrast AF method for the first time in a case where the state in which the degree of reliability of the focusing control using the phase difference AF method is low persists for a predetermined period.

A professional photographer waits for a time of about 2 to 3 seconds from a point of time when a desired subject is not properly in focus in a case where continuous AF is performed, and takes action such as switching the mode from continuous AF to manual AF in a case where the subject is still not in focus.

Meanwhile, a time from when the processing of step S1 of FIG. 7 is started to a time when the processing of step S2 is ended is a short time of about 0.2 seconds. Accordingly, it is preferable that the value of N is set to about 10 to 15 seconds with consideration for such circumstances.

As the value of N, any value may be set by the user through the manipulation unit 14. According to this configuration, it is possible to perform the continuous AF appropriate for user's preference.

According to the digital camera shown in FIG. 1, a probability that the focusing control using the phase difference AF method will be performed is higher than a probability that the focusing control using the contrast AF method will be performed during the continuous AF mode. Thus, it is possible to achieve low power consumption.

According to the digital camera shown in FIG. 1, the contrast AF area larger than the phase difference AF area used in a case where the focusing control using the phase difference AF method is performed is set in a case where the focusing control using the contrast AF method is performed.

As state above, it is possible to improve focusing accuracy using the contrast AF method by setting the contrast AF area having the large size.

In a case where the focusing position is not uniquely determined by the contrast AF processing unit 18 in step S8, the system controller 11 repeatedly performs processing for performing the expansion of the contrast AF area and the determination of the focusing position until the focusing position is uniquely determined without performing the focusing control using the contrast AF method.

The system controller 11 may return the processing to step S1 by moving the focus lens to the focusing position at a point of time when the focusing position is uniquely determined. By doing this, it is possible to improve the focusing accuracy.

In FIG. 7, the processing of step S7 may not be performed. In this case, the processing of step S8 is performed in a case where the determination result of step S6 is YES, and the contrast AF processing unit 18 may determine the focusing position based on the contrast of the captured image to be captured by the phase difference AF area in step S8.

The system controller 11 may perform variable control on the value of N.

For example, it is assumed that a first mode in which it is assumed that the digital camera shown in FIG. 1 images the same subject while focusing on the same subject for a long time (for example, a mode in which it is assumed that the digital camera images a train or a vehicle that is traveling) and a second mode in which it is assumed that the digital camera images subjects to be in focus while frequently switching between these subjects (for example, a mode in which it is assumed that the digital camera images a sports landscape such as a ball game performed by multiple people) are able to be set.

In this case, the system controller 11 sets the value of N in a case where the first mode is set to be larger than the value of N in a case where the second mode is set.

In a case where the subjects to be in focus are frequently switched and the subjects to be in focus are switched, there is a high possibility that the imaging lens is greatly deviated from the focusing state. Thus, in the second mode, the focusing control using the contrast AF method is easily performed by decreasing the value of N, and thus, it is possible to improve the quality of the captured image.

Meanwhile, the value of N increases in the first mode in which the subject to be in focus is hardly changed, and thus, the focusing control using the phase difference AF method is easily performed. As a result, it is possible to focus on the subject moving at a high speed with high accuracy, and thus, it is possible to improve the quality of the captured image.

Hereinafter, a modification example of the digital camera shown in FIG. 1 will be described.

First Modification Example

Figure 9:
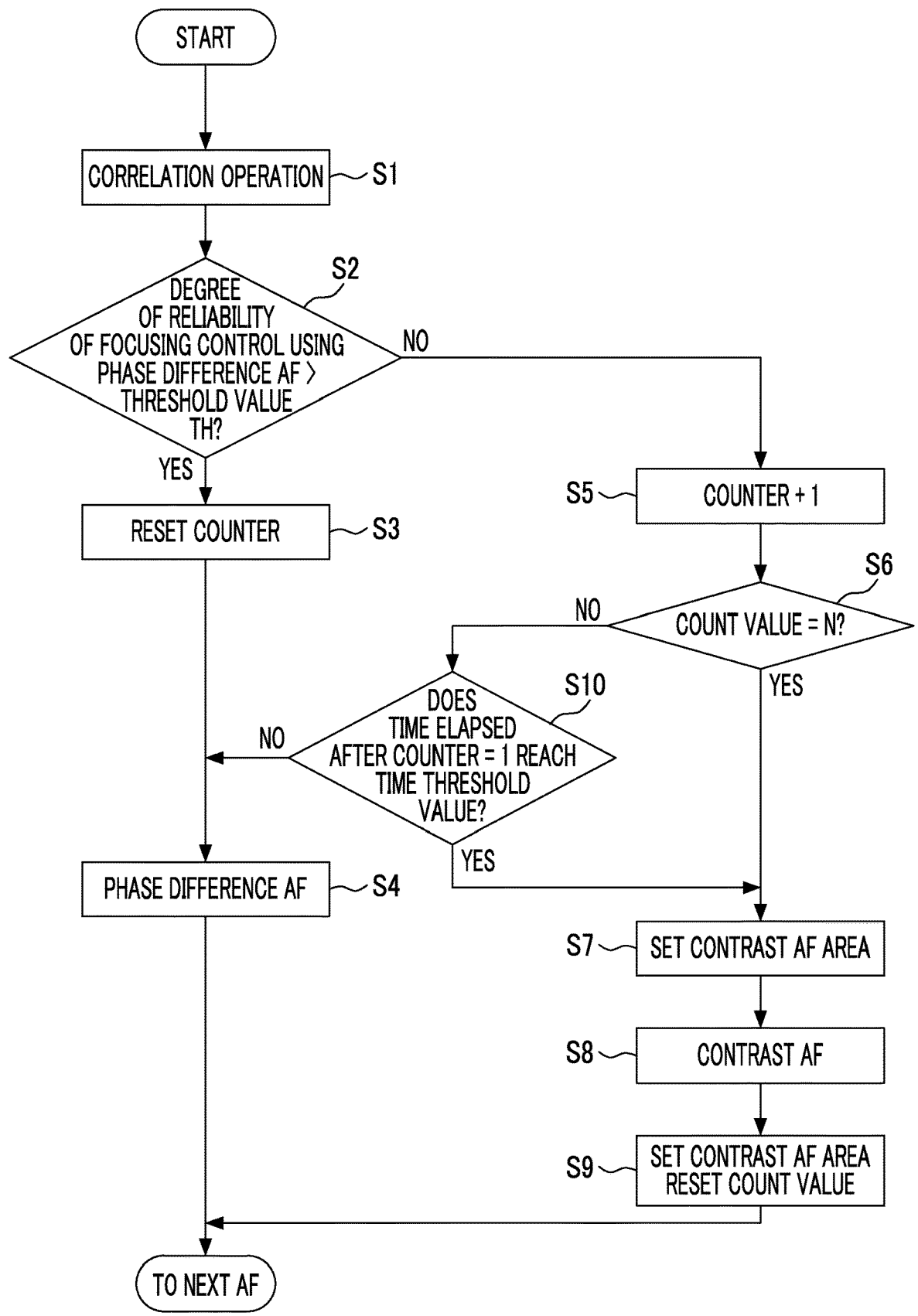
FIG. 9 is a flowchart for describing a modification example of the operation of the digital camera shown in FIG. 1 in the continuous AF mode.

FIG. 9 is a flowchart for describing a modification example of an operation of the digital camera shown in FIG. 1 in the continuous AF mode. In FIG. 9, the same processing as the processing shown in FIG. 7 will be assigned the same reference, and the description thereof will be omitted.

The system controller 11 performs the processing of step S10 in a case where the determination result of step S6 is NO.

In step S10, the system controller 11 calculates an elapsed time from a point of time when the count value is 1 (a point of time when the degree of reliability of the focusing control using the phase difference AF method is equal to or less than the threshold value TH) to the current point of time, and determines whether or not the elapsed time reaches a time threshold value.

In a case where it is determined that the elapsed time does not reach the time threshold value (step S10: NO), the system controller 11 performs the processing of step S4.

Meanwhile, in a case where it is determined that the elapsed time reaches the time threshold value (step S10: YES), the system controller 11 performs the processing of step S7 and the subsequent processing.

As described above, according to the first modification example, even though the state in which the degree of reliability of the focusing control using the phase difference AF method is equal to or less than the threshold value TH does not persist N times, in a case where the elapsed time after the degree of reliability is equal to or less than the threshold value TH reaches the time threshold value, the focusing control using the contrast AF method is performed.

As stated above, even in a situation in which a time until the focusing control using the phase difference AF method is completed increases as in a case where imaging is performed in a dark environment, it is possible to restrain a situation in which the focusing control using the contrast AF method is not properly performed by determining whether or not to perform the focusing control using the contrast AF method by adding the elapsed time after the count value becomes 1 (count value=1) in addition to the count value.

Accordingly, it is possible to improve the quality of the captured image by improving the focusing accuracy even in a case where the imaging is performed in the dark environment.

Second Modification Example

It is preferable that the system controller 11 sets the contrast AF area such that a difference between a width of the contrast AF area in the row direction X and a width of the phase difference AF area in the row direction X is greater than a difference between a width of the contrast AF area in the column direction Y and a width of the phase difference AF area in the column direction Y.

In this modification example, the row direction X constitutes a first direction, and the column direction Y constitutes a second direction.

In a case where the phase difference AF area is constituted by the plurality of AF areas 53, a width of the phase difference AF area in any direction means a width of an area including the plurality of AF areas 53 and the spacings between the plurality of AF areas 53 in any direction.

Figure 10A:
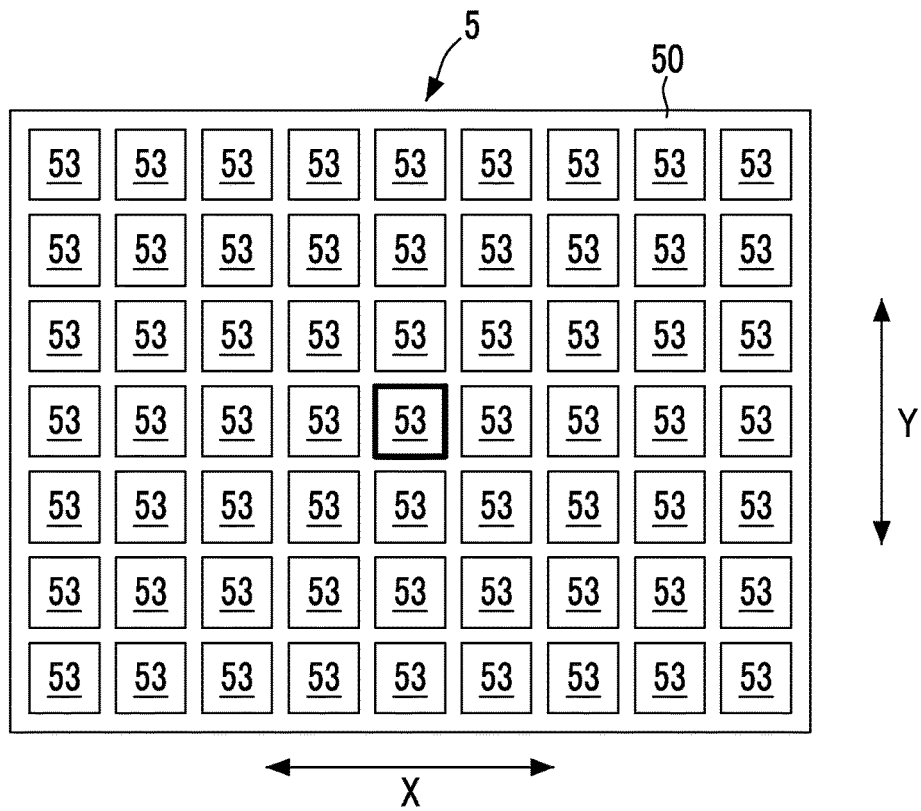
FIGS. 10A and 10B are schematic diagrams for describing another setting example of the contrast AF area.
Figure 10B:
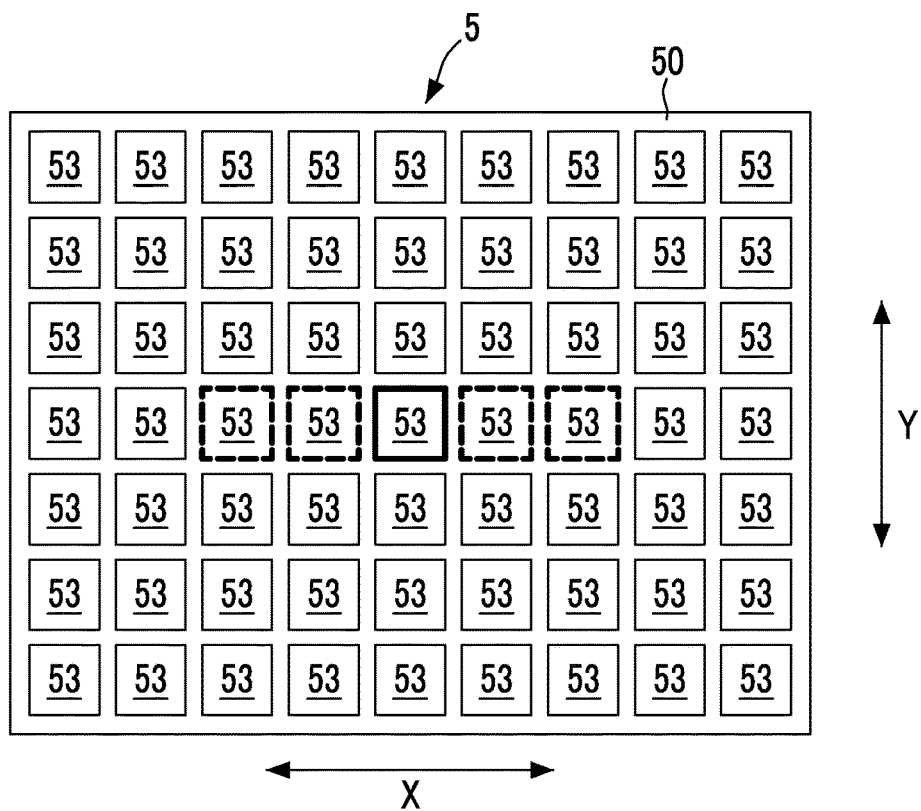

FIGS. 10A and 10B are schematic diagrams for describing another setting example of the contrast AF area.

For example, it is assumed that the phase difference AF area is the AF area 53 (surrounded by a thick frame in FIG. 10A) present in the center among the 63 AF areas 53, as shown in FIG. 10A.

In this case, in step S7 of FIG. 7 or 9, the system controller 11 sets, as the contrast AF area, an area surrounded by five AF areas 53 including the central AF area 53, two AF areas 53 (surrounded by dashed frames in FIG. 10B) adjacent to the central AF area 53 in the row direction X, and four AF areas 53 (surrounded by dashed frames in FIG. 10B) including the AF areas 53 adjacent to the two adjacent AF areas 53, as shown in FIG. 10B.

Figure 11A:
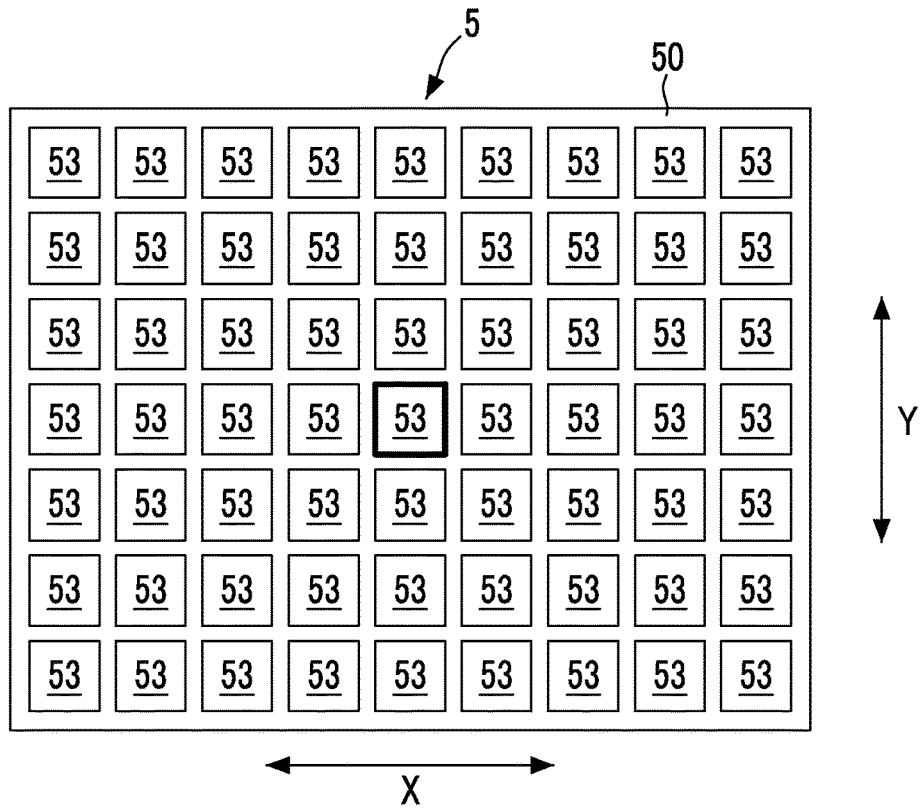
FIGS. 11A and 11B are schematic diagrams for describing still another setting example of the contrast AF area.
Figure 11B:
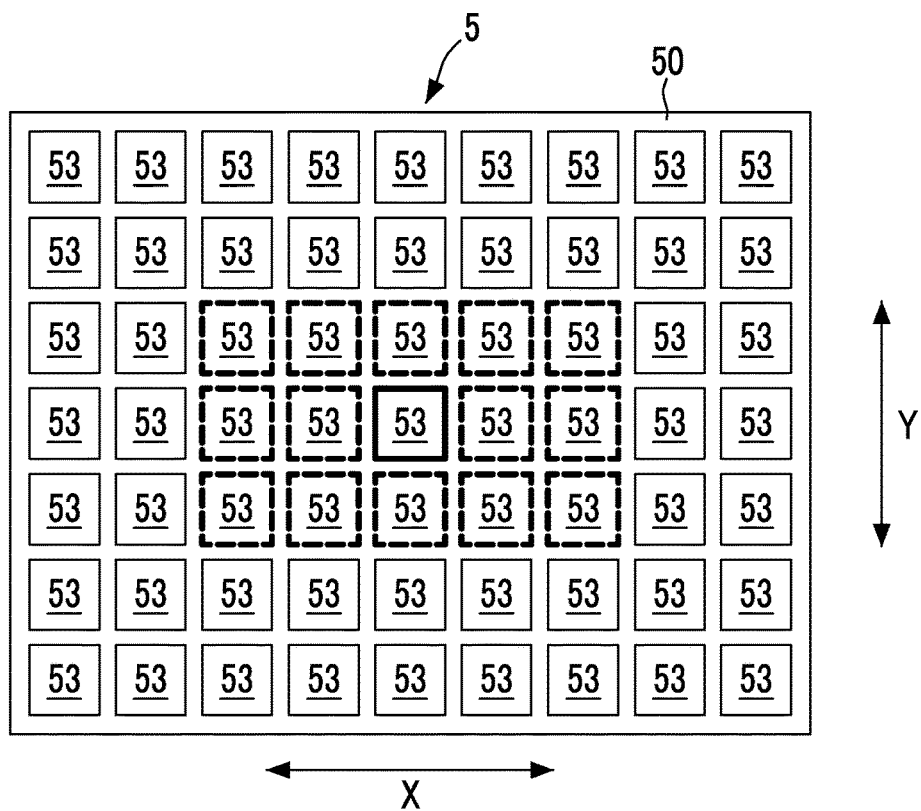

FIGS. 11A and 11B are schematic diagrams for describing still another setting example of the contrast AF area.

For example, it is assumed that the phase difference AF area is the AF area 53 (surrounded by a thick frame in FIG. 11A) present in the center among the 63 AF areas 53, as shown in FIG. 11A.

In this case, in step S7 of FIG. 7 or 9, the system controller 11 sets, as the contrast AF area, an area surrounded by 15 AF areas 53 including the central AF area 53 and 14 AF areas 53 (surrounded by dashed frames in FIG. 11B) present near the central AF area 53, as shown in FIG. 11B.

In a case where a posture of the digital camera is so-called lateral photographing which is a posture of which a direction of gravity is parallel to the column direction Y, a change in distance to the subject captured by the imaging element 5 increases in the column direction Y, and decreases in the row direction X.

Thus, as shown in FIGS. 10A to 11B, the contrast AF area is set in a shape elongated in the row direction X in which a change in the subject distance is relatively small, and thus, it is possible to reduce a possibility that a subject present at a distance greatly different from the main subject will be included in the subjects to be captured by the contrast AF area. Accordingly, it is possible to improve the accuracy of the focusing control using the contrast AF method.

Third Modification Example

Figure 12:
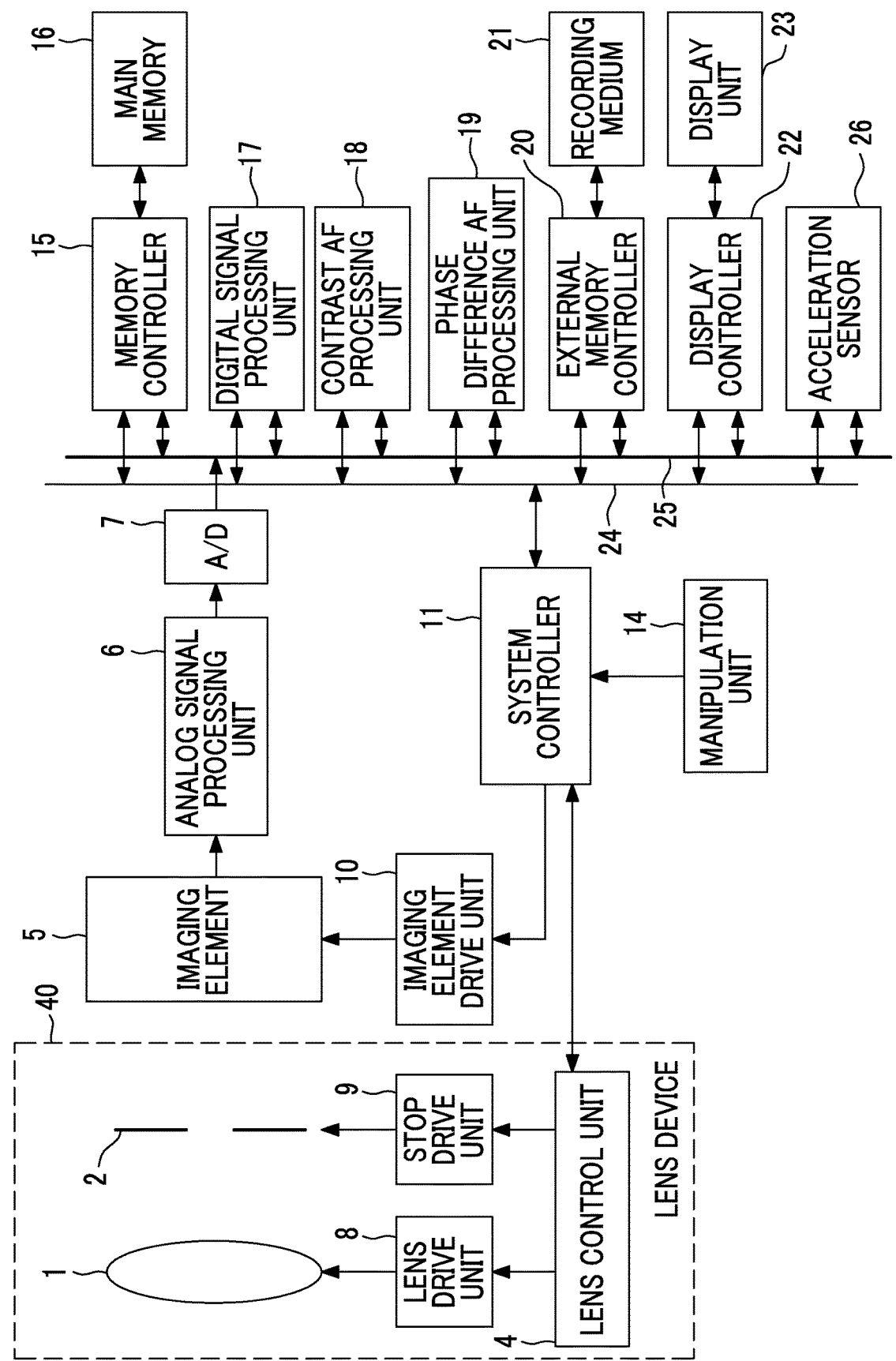
FIG. 12 is a diagram showing a modification example of the digital camera shown in FIG. 1.

FIG. 12 is a diagram showing a modification example of the digital camera shown in FIG. 1. The digital camera shown in FIG. 12 has the same configuration as that in FIG. 1 except that an acceleration sensor 26 is added.

For example, the acceleration sensor 26 is a sensor that detects accelerations in three axis directions such as an x-axis, a y-axis, and a z-axis, and may detect a direction of gravity by output signals of the sensor.

The system controller 11 detects the direction of gravity based on the output signals of the acceleration sensor 26. The system controller 11 constitutes a detection unit.

Figure 13:
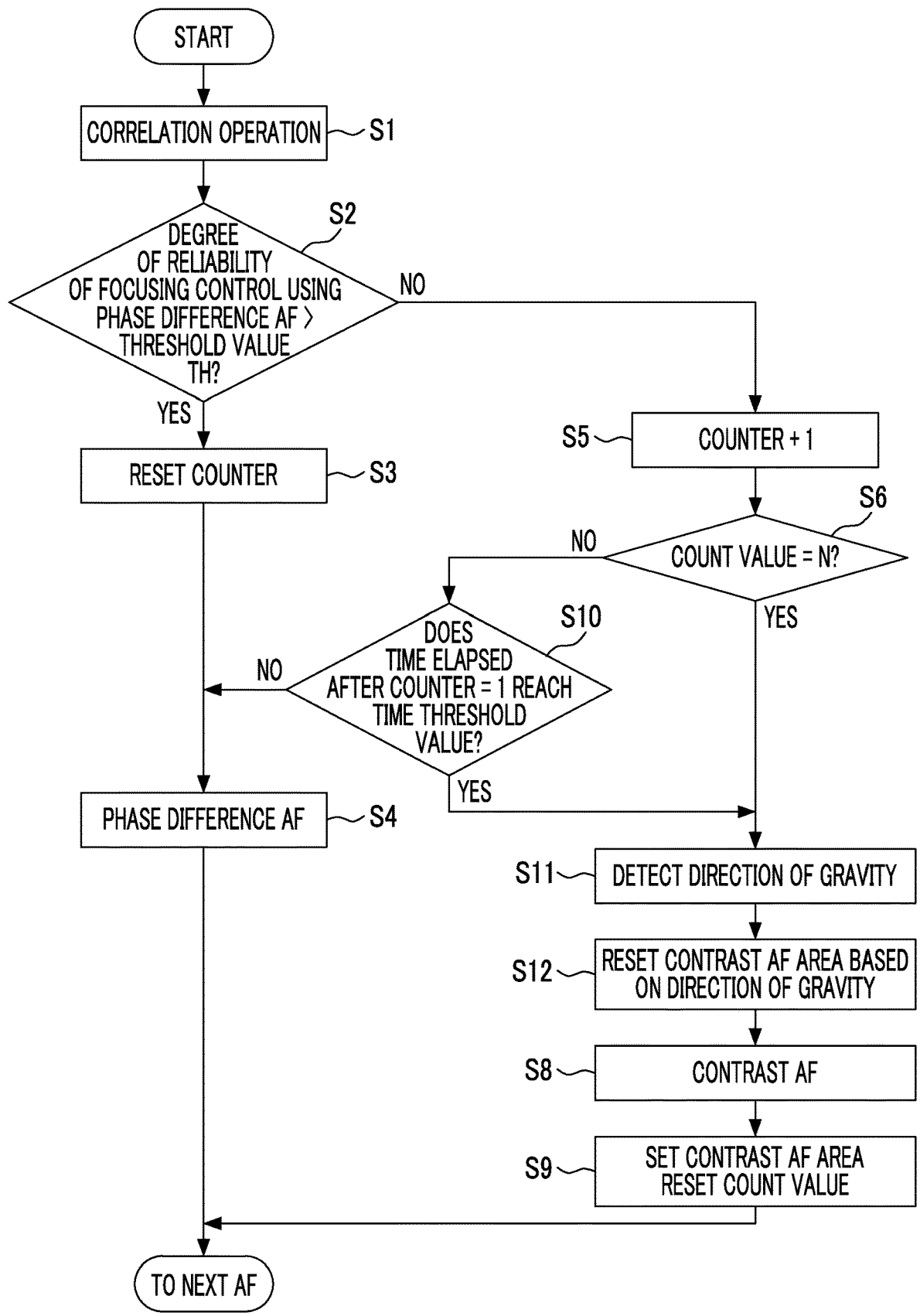
FIG. 13 is a flowchart for describing the operation of the digital camera shown in FIG. 12 in the continuous AF mode.

FIG. 13 is a flowchart for describing an operation of the digital camera shown in FIG. 12 in the continuous AF mode. In FIG. 13, the same processing as the processing of FIG. 9 will be assigned the same reference, and the description thereof will be omitted.

In a case where the determination result of step S10 is YES or the determination result of step S6 is YES, the system controller 11 detects the direction of gravity based on the output signals of the acceleration sensor 26 (step S11).

The system controller 11 sets the contrast AF area based on the detected direction of gravity and the phase difference AF area (step S12).

Figure 14:
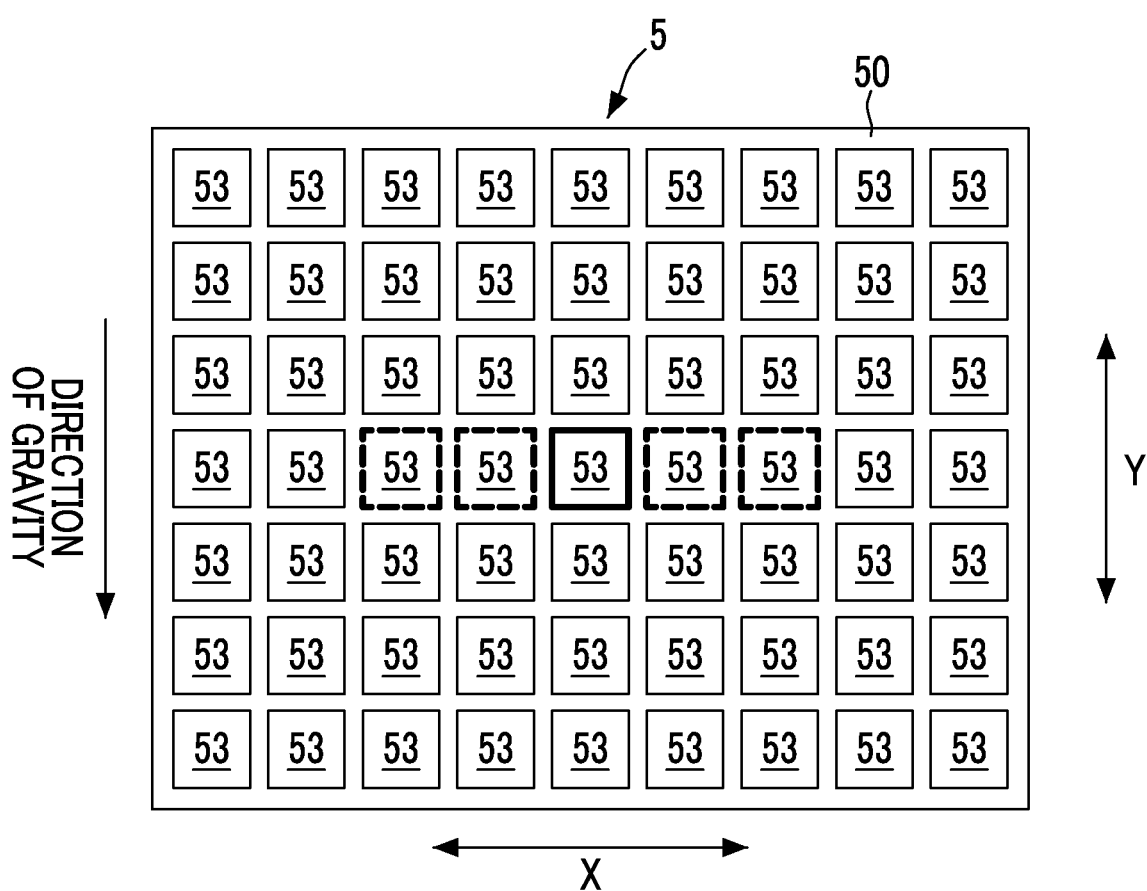
FIG. 14 is a schematic diagram for describing a setting example of a contrast AF area of the digital camera shown in FIG. 12.

Specifically, in a case where the detected direction of gravity is perpendicular to the row direction X, the system controller 11 sets the contrast AF area such that a difference between a width of the contrast AF area in the row direction X and a width of the phase difference AF area in the row direction X is greater than a difference between a width of the contrast AF area in the column direction Y and a width of the phase difference AF area in the column direction Y, as shown in FIG. 14.

In this modification example, in a case where the detected direction of gravity is perpendicular to the row direction X, the row direction X constitutes a first direction, and the column direction Y constitutes a second direction.

Figure 15:
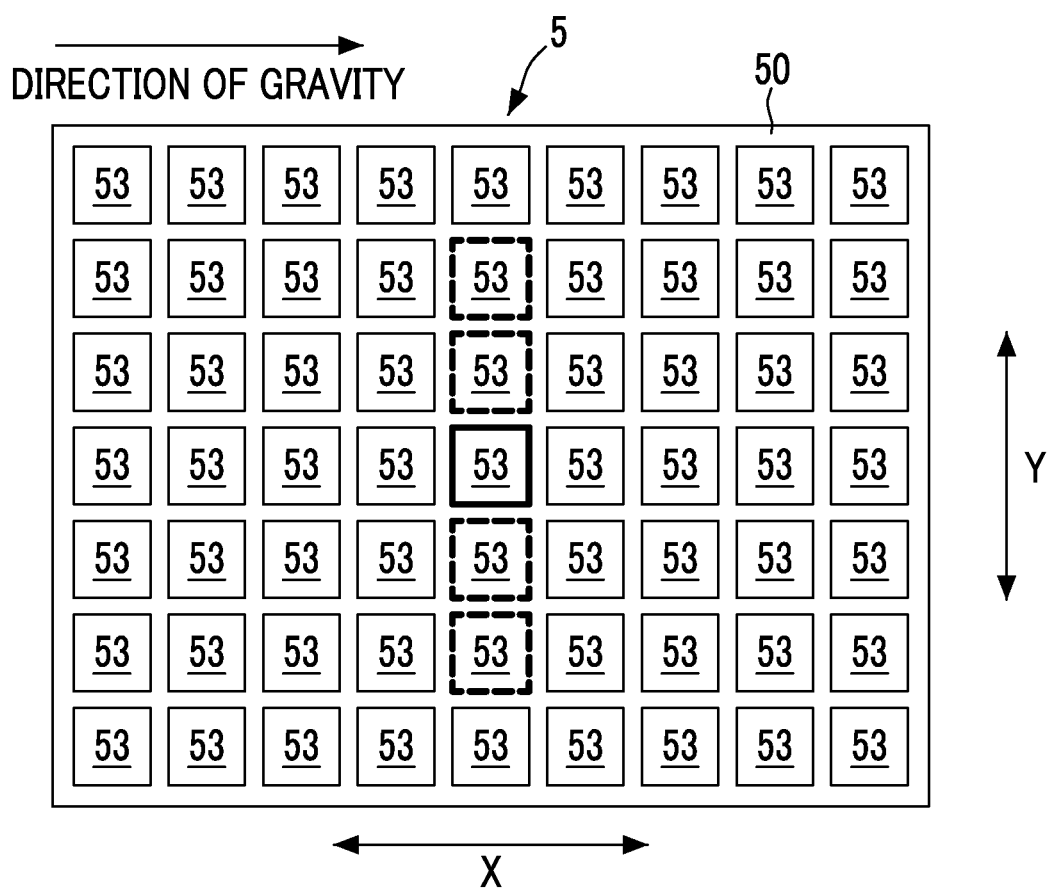
FIG. 15 is a schematic diagram for describing a setting example of the contrast AF area of the digital camera shown in FIG. 12.

Meanwhile, in a case where the detected direction of gravity is perpendicular to the column direction Y, the system controller 11 sets the contrast AF area such that a difference between a width of the contrast AF area in the column direction Y and a width of the phase difference AF area in the column direction Y is greater than a difference between a width of the contrast AF area in the row direction X and a width of the phase difference AF area in the row direction X, as shown in FIG. 15.

In this modification example, in a case where the detected direction of gravity is perpendicular to the column direction Y, the column direction Y constitutes a first direction, and the row direction X constitutes a second direction.

A case where two directions are perpendicular to each other is not limited to a case where an angle formed by the two directions is completely 90 degrees, and means a state in which this angle is approximately 90 degrees (for example, a range of 80 degrees or more and 100 degrees or less).

After step S12, the processing of step S8 and the subsequent processing are performed.

According to the third modification example, since the contrast AF area is set depending on the posture of the digital camera, even in a case where the posture of the digital camera is longitudinal photographing or lateral photographing, it is possible to improve the focusing accuracy in a case where the focusing control using the contrast AF method is performed.

In FIG. 13, the processing of step S10 may not be performed. In a case where step S10 is omitted and the determination result of step S6 is NO, the processing of step S4 is performed.

Hereinafter, a configuration of a smartphone as the imaging device will be described.

Figure 16:
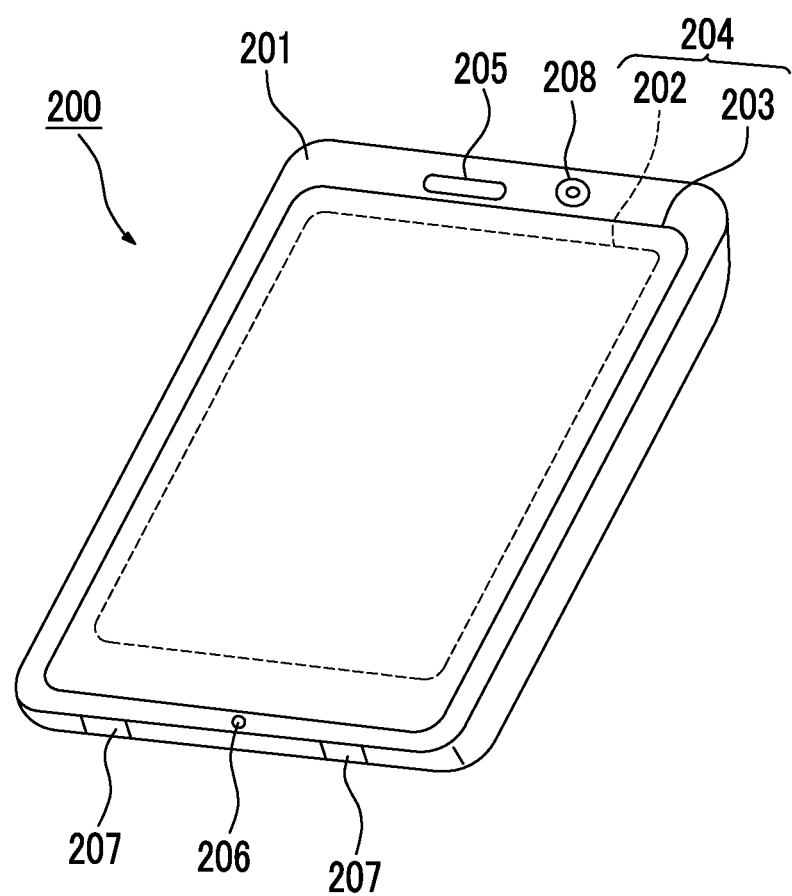
FIG. 16 shows an external appearance of a smartphone 200 which is an embodiment of the imaging device according to the present invention.

FIG. 16 shows an external appearance of a smartphone 200 which is an embodiment of the imaging device according to the present invention.

The smartphone 200 shown in FIG. 16 has a flat casing 201, and comprises a display input unit 204 in which a display panel 202 as a display unit and a manipulation panel 203 as an input unit are integrally formed on one surface of the casing 201.

Such a casing 201 comprises a speaker 205, a microphone 206, a manipulation unit 207, and a camera unit 208.

The configuration of the casing 201 is not limited thereto. For example, the display unit and the input unit may be independent of each other, or may have a folding structure or a slide mechanism.

Figure 17:
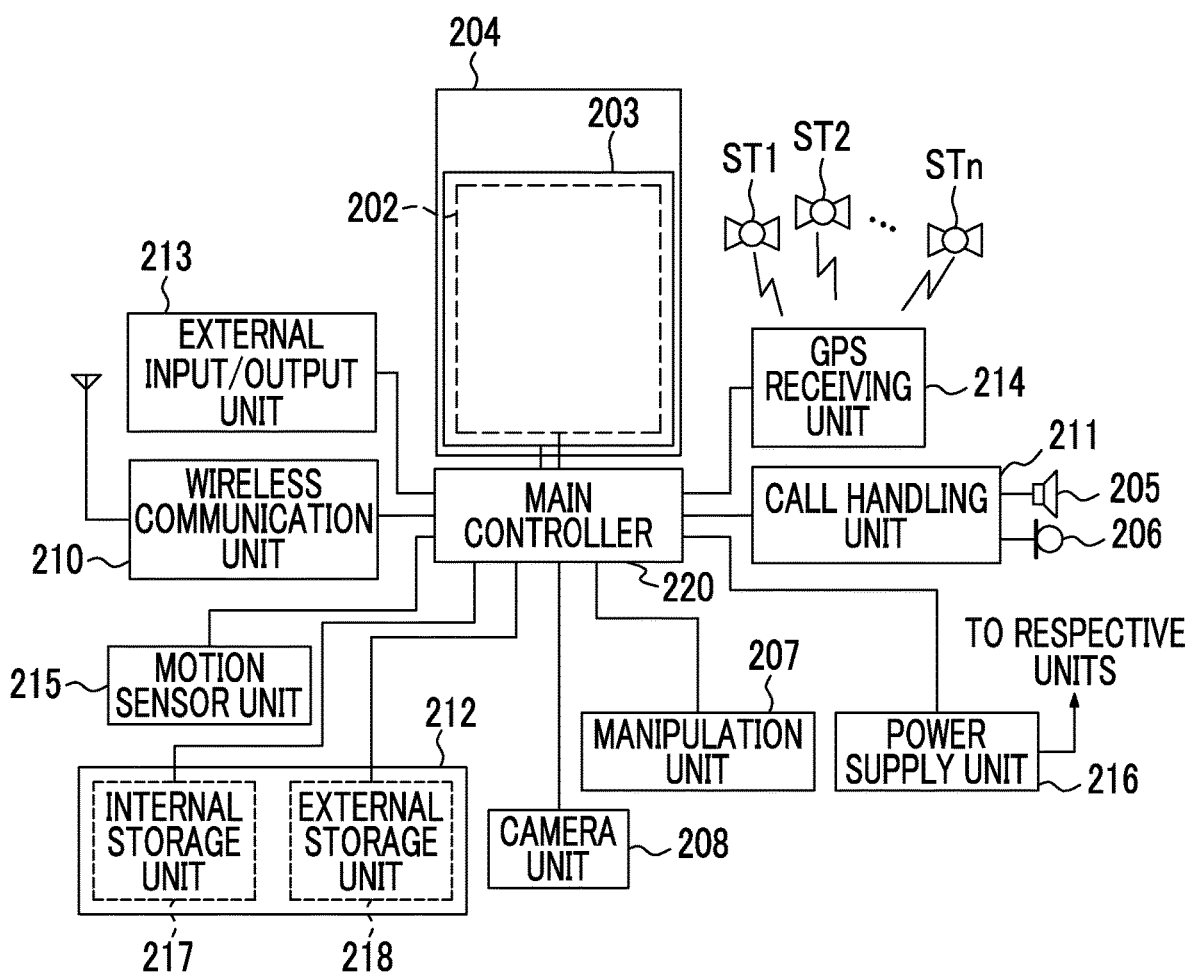
FIG. 17 is a block diagram showing a configuration of the smartphone 200 shown in FIG. 16.

FIG. 17 is a block diagram showing the configuration of the smartphone 200 shown in FIG. 16.

As shown in FIG. 17, principal components of the smartphone comprise a wireless communication unit 210, a display input unit 204, a call handling unit 211, a manipulation unit 207, a camera unit 208, a storage unit 212, an external input and output unit 213, a Global Positioning System (GPS) receiving unit 214, a motion sensor unit 215, a power supply unit 216, and a main controller 220.

Principal functions of the smartphone 200 comprise a wireless communication function of performing mobile wireless communication through a base station device BS (not shown) and a mobile communication network NW (not shown).

The wireless communication unit 210 performs wireless communication with a base station device BS in the mobile communication network NW according to a command of the main controller 220. With the use of the wireless communication, the transmission and reception of various kinds of file data, such as voice data and image data, and electronic mail data, or the reception of Web data and streaming data are performed.

The display input unit 204 is a so-called touch panel which displays images (still images and moving images) or character information to visually transfer information to the user and detects a user's manipulation on the displayed information under the control of the main controller 220, and comprises the display panel 202 and the manipulation panel 203.

The display panel 202 uses a liquid crystal display (LCD) or an organic electro-luminescence display (OELD) as a display device.

The manipulation panel 203 is a device which is placed such that an image displayed on a display surface of the display panel 202 is visible, and detects one or a plurality of coordinates of a manipulation with a user's finger or a stylus. In a case where the device is manipulated with the user's finger or the stylus, a detection signal due to the manipulation is output to the main controller 220. Next, the main controller 220 detects a manipulation position (coordinates) on the display panel 202 based on the received detection signal.

As shown in FIG. 16, although the display panel 202 and the manipulation panel 203 of the smartphone 200 illustrated as an embodiment of an imaging device of the present invention are integrated to constitute the display input unit 204, the manipulation panel 203 is arranged to completely cover the display panel 202.

In a case where this arrangement is employed, the manipulation panel 203 may have a function of detecting a user's manipulation even in an area outside the display panel 202. In other words, the manipulation panel 203 may comprise a detection area (hereinafter, referred to as a display area) for an overlapped portion which overlaps the display panel 202 and a detection area (hereinafter, referred to as a non-display area) for an outer edge portion which does not overlap the display panel 202 other than the display area.

Although the size of the display area may completely match the size of the display panel 202, it is not necessary to match both of the size of the display area and the size of the display panel. The manipulation panel 203 may comprise two sensitive areas including an outer edge portion and an inner portion other than the outer edge portion.

The width of the outer edge portion is appropriately designed according to the size of the casing 201 or the like. As a position detection system which is employed in the manipulation panel 203, a matrix switching system, a resistive film system, a surface acoustic wave system, an infrared system, an electromagnetic induction system, an electrostatic capacitance system, and the like are exemplified, and any system can be employed.

The call handling unit 211 comprises the speaker 205 and the microphone 206, converts voice of the user input through the microphone 206 to voice data processable in the main controller 220 and outputs voice data to the main controller 220, or decodes voice data received by the wireless communication unit 210 or the external input and output unit 213 and outputs voice from the speaker 205.

As shown in FIG. 16, for example, the speaker 205 can be mounted on the same surface as the surface on which the display input unit 204 is provided, and the microphone 206 can be mounted on the side surface of the casing 201.

The manipulation unit 207 is a hardware key using a key switch or the like, and receives a command from the user. For example, as shown in FIG. 16, the manipulation unit 207 is a push button-type switch which is mounted on the side surface of the casing 201 of the smartphone 200, and is turned on by being depressed with a finger or the like and is turned off by restoration force of the panel or the like in a case where the finger is released.

The storage unit 212 stores a control program or control data of the main controller 220, application software, address data in association with the name, telephone number, and the like of a communication partner, data of transmitted and received electronic mail, Web data downloaded by Web browsing, and downloaded content data, and temporarily stores streaming data or the like.

The storage unit 212 is constituted by an internal storage unit 217 embedded in the smartphone and an external storage unit 218 having a slot for a detachable external memory.

The internal storage unit 217 and the external storage unit 218 constituting the storage unit 212 are realized using a memory (for example, a microSD (Registered Trademark) memory or the like), such as a flash memory type, a hard disk type, a multimedia card micro type, or a card type, or a storage medium, such as a random access memory (RAM) or a read only memory (ROM).

The external input and output unit 213 plays a role of an interface with all external devices connected to the smartphone 200, and is provided for direct or indirect connection to other external devices through communication or the like (for example, universal serial bus (USB), IEEE 1394, or the like), or a network (for example, the Internet, wireless LAN, Bluetooth (Registered trademark), radio frequency identification (RFID), infrared communication (Infrared Data Association: IrDA) (Registered Trademark), Ultra Wideband (UWB) (Registered Trademark), ZigBee (Registered Trademark), or the like).

The external devices connected to the smartphone 200 are, for example, a wired or wireless headset, a wired or wireless external charger, a wired or wireless data port, a memory card connected through a card socket, a subscriber identity module (SIM) card, a user identity module (UIM) card, an external audio-video device connected through an audio-video input and output (I/O) terminal, an external audio-video device connected in a wireless manner, a smartphone connected in a wired or wireless manner, a personal computer connected in a wired or wireless manner, a PDA connected in a wired or wireless manner, an earphone connected in a wired or wireless manner, and the like. The external input and output unit 213 can transfer data transmitted from the external devices to the respective components in the smartphone 200 or can transmit data in the smartphone 200 to the external devices.

The GPS receiving unit 214 receives GPS signals transmitted from GPS satellites ST1 to STn according to a command of the main controller 220, executes positioning calculation processing based on a plurality of received GPS signals, and detects the position of the smartphone 200 having latitude, longitude, and altitude.

In a case where positional information can be acquired from the wireless communication unit 210 or the external input and output unit 213 (for example, a wireless LAN), the GPS receiving unit 214 can detect the position using the positional information.

The motion sensor unit 215 comprises, for example, a three-axis acceleration sensor or the like, and detects physical motion of the smartphone 200 according to a command of the main controller 220. The moving direction or acceleration of the smartphone 200 is detected by detecting physical motion of the smartphone 200. The detection result is output to the main controller 220.

The power supply unit 216 supplies electric power stored in a battery (not shown) to the respective units of the smartphone 200 according to a command of the main controller 220.

The main controller 220 comprises a microprocessor, operates according to the control program or control data stored in the storage unit 212, and integrally controls the respective units of the smartphone 200.

The main controller 220 has a mobile communication control function of controlling respective units of a communication system in order to perform voice communication or data communication through the wireless communication unit 210, and an application processing function.

The application processing function is realized by the main controller 220 operating according to application software stored in the storage unit 212. The application processing function is, for example, an infrared communication function of controlling the external input and output unit 213 to perform data communication with a device facing the smartphone 200, an electronic mail function of transmitting and receiving electronic mail, a Web browsing function of browsing Web pages, or the like.

The main controller 220 has an image processing function of displaying video on the display input unit 204, or the like based on image data (still image or moving image data), such as received data or downloaded streaming data. The image processing function refers to a function of the main controller 220 decoding image data, performing image processing on the decoding result, and displaying an image on the display input unit 204.

The main controller 220 executes display control on the display panel 202 and manipulation detection control for detecting a user's manipulation through the manipulation unit 207 and the manipulation panel 203.

With the execution of the display control, the main controller 220 displays an icon for activating application software or a software key, such as a scroll bar, or displays a window for creating electronic mail.

The scroll bar refers to a software key for receiving a command to move a display portion of an image which is too large to fit into the display area of the display panel 202.

With the execution of the manipulation detection control, the main controller 220 detects a user's manipulation through the manipulation unit 207, receives a manipulation on the icon or an input of a character string in an entry column of the window through the manipulation panel 203, or receives a scroll request of a display image through the scroll bar.

In addition, with the execution of the manipulation detection control, the main controller 220 has a touch panel control function of determining whether a manipulation position on the manipulation panel 203 is the superimposed portion (display area) overlapping the display panel 202 or the outer edge portion (non-display area) not overlapping the display panel 202 other than the display area, and controlling the sensitive area of the manipulation panel 203 or the display position of the software key.

The main controller 220 may detect a gesture manipulation on the manipulation panel 203 and may execute a function set in advance according to the detected gesture manipulation.

The gesture manipulation is not a conventional simple touch manipulation, but means a manipulation to render a track with a finger or the like, a manipulation to simultaneously designate a plurality of positions, or a manipulation to render a track for at least one of a plurality of positions by combining the above-described manipulations.

The camera unit 208 includes the configuration other than the external memory controller 20, the recording medium 21, the display controller 22, the display unit 23, and the manipulation unit 14 in the digital camera shown in FIG. 1 or 12. Captured image data generated by the camera unit 208 can be recorded in the storage unit 212 or can be output through the external input and output unit 213 or the wireless communication unit 210.

In the smartphone 200 shown in FIG. 16, although the camera unit 208 is mounted on the same surface as the display input unit 204, the mounting position of the camera unit 208 is not limited thereto, and the camera unit 208 may be mounted on the rear surface of the display input unit 204.

The camera unit 208 can be used for various functions of the smartphone 200. For example, an image acquired by the camera unit 208 can be displayed on the display panel 202, or an image in the camera unit 208 can be used as one manipulation input of the manipulation panel 203.

In a case where the GPS receiving unit 214 detects the position, the position may be detected with reference to an image from the camera unit 208. In addition, the optical axis direction of the camera unit 208 of the smartphone 200 can be determined or a current use environment may be determined with reference to an image from the camera unit 208 without using the three-axis acceleration sensor or in combination with the three-axis acceleration sensor. Of course, an image from the camera unit 208 may be used in application software.

In addition, image data of a still image or a moving image may be attached with positional information acquired by the GPS receiving unit 214, voice information (which may be converted to text information through voice-text conversion by the main controller or the like) acquired by the microphone 206, posture information acquired by the motion sensor unit 215, or the like and can be recorded in the storage unit 212, or may be output through the external input and output unit 213 or the wireless communication unit 210.

In the smartphone 200 having the aforementioned configuration, it is possible to perform high-quality imaging through the aforementioned processing using the system controller 11 shown in FIG. 1 or 12.

Although it has been described in the aforementioned embodiment and modification examples that the phase difference is detected in the row direction X, the present invention may be similarly applied to a case where the phase difference is detected in the column direction Y.

As described above, the following matters are disclosed in this specification.

(1) There is provided an imaging device comprising an imaging element that images a subject through an imaging optical system including a focus lens, first signal detection parts that detect signals corresponding to one of a pair of luminous fluxes passed through different portions of a pupil area of the imaging optical system, second signal detection parts that detect signals corresponding to the other one of the pair of luminous fluxes, and a focusing controller that selectively performs focusing control using a phase difference AF method using a result of a correlation operation of detection signals of the first signal detection parts and detection signals of the second signal detection parts or focusing control using a contrast AF method using contrast of a captured image captured by the imaging element in a mode in which focusing control for focusing on a main subject by driving the focus lens is continuously performed multiple times. The focusing controller performs the focusing control using the contrast AF method in a case where a state in which a degree of reliability of the focusing control using the phase difference AF method is equal to or less than a threshold value persists N times, N being a natural number of 2 or more, while the focusing control using the phase difference AF method is continuously performed.

(2) In the imaging device according to (1), the focusing controller performs variable control on a value of the N.

(3) In the imaging device according to (1) or (2), the focusing controller performs the focusing control using the contrast AF method in a case where the state in which the degree of reliability is equal to or less than the threshold value persists less than N times and an elapsed time after the degree of reliability is equal to or less than the threshold value reaches a time threshold value while the focusing control using the phase difference AF method is continuously performed.

(4) In the imaging device according to any one of (1) to (3), the focusing controller sets a first subject area, which is to be in focus in a case where the focusing control using the contrast AF method is performed, to be an area which includes a second subject area to be in focus in the focusing control using the phase difference AF method and is larger than the second subject area.

(5) In the imaging device according to (4), the focusing controller sets a difference between a width of the second subject area in a first direction and a width of the first subject area in the first direction to be greater than a difference between a width of the second subject area in a second direction perpendicular to the first direction and a width of the first subject area in the second direction.

(6) The imaging device according to (5) further comprises a detection unit that detects a direction of gravity. The focusing controller sets the first subject area with a direction perpendicular to the direction of gravity as the first direction.

(7) There is provided a focusing control method comprising a focusing control step of selectively performing focusing control using a phase difference AF method using a result of a correlation operation of detection signals of first signal detection parts that detect signals corresponding to one of a pair of luminous fluxes passed through different portions of a pupil area of an imaging optical system and detection signals of second signal detection parts that detect signals corresponding to the other one of the pair of luminous fluxes or focusing control using a contrast AF method using contrast of a captured image captured by an imaging element that images a subject through the imaging optical system, in a case where focusing control for focusing on a main subject by driving a focus lens of the imaging optical system including the focus lens is continuously performed multiple times. In the focusing control step, the focusing control using the contrast AF method is performed in a case where a state in which a degree of reliability of the focusing control using the phase difference AF method is equal to or less than a threshold value persists N times, N being a natural number of 2 or more, while the focusing control using the phase difference AF method is continuously performed.

(8) In the focusing control method according to (7), in the focusing control step, a value of the N is controlled.

(9) In the focusing control method according to (7) or (8), in the focusing control step, the focusing control using the contrast AF method is performed in a case where the state in which the degree of reliability is equal to or less than the threshold value persists less than N times and an elapsed time after the degree of reliability is equal to or less than the threshold value reaches a time threshold value while the focusing control using the phase difference AF method is continuously performed.

(10) In the focusing control method according to any one of (7) to (9), in the focusing control step, a first subject area to be in focus in a case where the focusing control using the contrast AF method is performed is set to be an area which includes a second subject area to be in focus in the focusing control using the phase difference AF method and is larger than the second subject area.

(11) In the focusing control method according to (10), in the focusing control step, a difference between a width of the second subject area in a first direction and a width of the first subject area in the first direction is set to be greater than a difference between a width of the second subject area in a second direction perpendicular to the first direction and a width of the first subject area in the second direction.

(12) The focusing control method according to (11) further comprises a detection step of detecting a direction of gravity. In the focusing control step, the first subject area is set with a direction perpendicular to the direction of gravity as the first direction.

(13) There is provided a focusing control program causing a computer to perform a focusing control step of selectively performing focusing control using a phase difference AF method using a result of a correlation operation of detection signals of first signal detection parts that detect signals corresponding to one of a pair of luminous fluxes passed through different portions of a pupil area of an imaging optical system and detection signals of second signal detection parts that detect signals corresponding to the other one of the pair of luminous fluxes or focusing control using a contrast AF method using contrast of a captured image captured by an imaging element that images a subject through the imaging optical system, in a case where focusing control for focusing on a main subject by driving a focus lens of the imaging optical system including the focus lens is continuously performed multiple times. In the focusing control step, the focusing control using the contrast AF method is performed in a case where a state in which a degree of reliability of the focusing control using the phase difference AF method is equal to or less than a threshold value persists N times, N being a natural number of 2 or more, while the focusing control using the phase difference AF method is continuously performed.

(14) There is provided an imaging device comprising an imaging element that images a subject through an imaging optical system including a focus lens, first signal detection parts that detect signals corresponding to one of a pair of luminous fluxes passed through different portions of a pupil area of the imaging optical system, second signal detection parts that detect signals corresponding to the other one of the pair of luminous fluxes, and a processor that selectively performs focusing control using a phase difference AF method using a result of a correlation operation of detection signals of the first signal detection parts and detection signals of the second signal detection parts or focusing control using a contrast AF method using contrast of a captured image captured by the imaging element in a mode in which focusing control for focusing on a main subject by driving the focus lens is continuously performed multiple times. The focusing controller performs the focusing control using the contrast AF method in a case where a state in which a degree of reliability of the focusing control using the phase difference AF method is equal to or less than a threshold value persists N times, N being a natural number of 2 or more, while the focusing control using the phase difference AF method is continuously performed.

The present invention is applied to a digital camera to achieve high convenience and effectiveness.

Although the present invention has been described in conjunction with a specific embodiment, the present invention is not limited to the embodiment, and may be variously changed without departing from the technical spirit of the present invention disclosed herein.

This application is based on Japanese Patent Application (2016-110391), filed Jun. 1, 2016, the content of which is incorporated herein.

EXPLANATION OF REFERENCES

1: imaging lens
2: stop

4: lens controller
5: imaging element
6: analog signal processing unit
7: analog-to-digital conversion circuit
8: lens drive unit
9: stop drive unit
10: imaging element drive unit
11: system controller
14: manipulation unit
15: memory controller
16: main memory
17: digital signal processing unit
18: contrast AF processing unit
19: phase difference AF processing unit
20: external memory controller
21: recording medium
22: display controller
23: display unit
24: control bus
25: data bus
26: acceleration sensor
50: light receiving surface
51: pixel
52A, 52B: phase-difference detecting pixel
53: AF area
PL1, PL2, PL3: pair row
c: opening
PD: photoelectric conversion unit
X: row direction
Y: column direction
200: smartphone
201: casing
202: display panel
203: manipulation panel
204: display input unit
205: speaker
206: microphone
207: manipulation unit
208: camera unit
210: wireless communication unit
211: call handling unit
212: storage unit
213: external input and output unit
214: GPS receiving unit
215: motion sensor unit
216: power supply unit
217: internal storage unit
218: external storage unit
220: main controller
ST1 to STn: GPS satellite

What is claimed is:

1. An imaging device comprising:
an imaging element comprising a plurality of pixels, wherein the imaging element images a subject through an imaging optical system comprising a focus lens, wherein
first signal detection parts of the plurality of pixels detect signals corresponding to one of a pair of luminous fluxes passed through different portions of a pupil area of the imaging optical system, and
second signal detection parts of the plurality of pixels detect signals corresponding to other one of the pair of luminous fluxes; and
a focusing controller that selectively performs focusing control by a phase difference AF method using a result of a correlation operation of detection signals of the first signal detection parts and detection signals of the second signal detection parts or focusing control by a contrast AF method using contrast of a captured image captured by the imaging element in a mode in which focusing control for focusing on a main subject by driving the focus lens is continuously performed multiple times,
wherein the focusing controller performs the focusing control by the contrast AF method in a case where a state in which a degree of reliability of the focusing control by the phase difference AF method is equal to or less than a threshold value persists N times, N being a natural number of 2 or more, while the focusing control by the phase difference AF method is continuously performed, and
the focusing controller performs the focusing control by the contrast AF method in a case where the state in which the degree of reliability is equal to or less than the threshold value persists less than N times and an elapsed time after the degree of reliability is equal to or less than the threshold value reaches a time threshold value while the focusing control by the phase difference AF method is continuously performed.

2. The imaging device according to claim 1, wherein the focusing controller performs variable control on a value of the N.

3. The imaging device according to claim 1, wherein the focusing controller sets a first subject area, which is to be in focus in a case where the focusing control by the contrast AF method is performed, to be an area which includes a second subject area to be in focus in the focusing control by the phase difference AF method and is larger than the second subject area.

4. The imaging device according to claim 2, wherein the focusing controller sets a first subject area, which is to be in focus in a case where the focusing control by the contrast AF method is performed, to be an area which includes a second subject area to be in focus in the focusing control by the phase difference AF method and is larger than the second subject area.

5. The imaging device according to claim 3, wherein the focusing controller sets a difference between a width of the second subject area in a first direction and a width of the first subject area in the first direction to be greater than a difference between a width of the second subject area in a second direction perpendicular to the first direction and a width of the first subject area in the second direction.

6. The imaging device according to claim 4, wherein the focusing controller sets a difference between a width of the second subject area in a first direction and a width of the first subject area in the first direction to be greater than a difference between a width of the second subject area in a second direction perpendicular to the first direction and a width of the first subject area in the second direction.

7. The imaging device according to claim 5, wherein the focusing controller further detects a direction of gravity, wherein the focusing controller sets the first subject area with a direction perpendicular to the direction of gravity as the first direction.

8. The imaging device according to claim 6, further comprising:
a detection unit that detects a direction of gravity, wherein the focusing controller sets the first subject area with a direction perpendicular to the direction of gravity as the first direction.

9. An imaging device comprising:
an imaging element comprising a plurality of pixels, wherein the imaging element images a subject through an imaging optical system comprising a focus lens, wherein
first signal detection parts of the plurality of pixels detect signals corresponding to one of a pair of luminous fluxes passed through different portions of a pupil area of the imaging optical system, and
second signal detection parts of the plurality of pixels detect signals corresponding to other one of the pair of luminous fluxes;
a focusing controller that selectively performs focusing control by a phase difference AF method using a result of a correlation operation of detection signals of the first signal detection parts and detection signals of the second signal detection parts or focusing control by a contrast AF method using contrast of a captured image captured by the imaging element in a mode in which focusing control for focusing on a main subject by driving the focus lens is continuously performed multiple times; and
a detection unit that detects a direction of gravity,
wherein the focusing controller performs the focusing control by the contrast AF method in a case where a state in which a degree of reliability of the focusing control by the phase difference AF method is equal to or less than a threshold value persists N times, N being a natural number of 2 or more, while the focusing control by the phase difference AF method is continuously performed,
the focusing controller sets a first subject area, which is to be in focus in a case where the focusing control by the contrast AF method is performed, to be an area which includes a second subject area to be in focus in the focusing control by the phase difference AF method and is larger than the second subject area,
the focusing controller sets a difference between a width of the second subject area in a first direction and a width of the first subject area in the first direction to be greater than a difference between a width of the second subject area in a second direction perpendicular to the first direction and a width of the first subject area in the second direction, and
the focusing controller sets the first subject area with a direction perpendicular to the direction of gravity as the first direction.

10. A focusing control method comprising:
a focusing control step of selectively performing focusing control by a phase difference AF method using a result of a correlation operation of detection signals of first signal detection parts that detect signals corresponding to one of a pair of luminous fluxes passed through different portions of a pupil area of an imaging optical system and detection signals of second signal detection parts that detect signals corresponding to other one of the pair of luminous fluxes or focusing control by a contrast AF method using contrast of a captured image captured by an imaging element that images a subject through the imaging optical system, in a case where focusing control for focusing on a main subject by driving a focus lens of the imaging optical system including the focus lens is continuously performed multiple times,
wherein, in the focusing control step, the focusing control by the contrast AF method is performed in a case where a state in which a degree of reliability of the focusing control by the phase difference AF method is equal to or less than a threshold value persists N times, N being a natural number of 2 or more, while the focusing control by the phase difference AF method is continuously performed, and
in the focusing control step, the focusing control by the contrast AF method is performed in a case where the state in which the degree of reliability is equal to or less than the threshold value persists less than N times and an elapsed time after the degree of reliability is equal to or less than the threshold value reaches a time threshold value while the focusing control by the phase difference AF method is continuously performed.

11. The focusing control method according to claim 10, wherein, in the focusing control step, a value of the N is controlled.

12. The focusing control method according to claim 10, wherein, in the focusing control step, a first subject area to be in focus in a case where the focusing control by the contrast AF method is performed is set to be an area which includes a second subject area to be in focus in the focusing control by the phase difference AF method and is larger than the second subject area.

13. The focusing control method according to claim 11, wherein, in the focusing control step, a first subject area to be in focus in a case where the focusing control by the contrast AF method is performed is set to be an area which includes a second subject area to be in focus in the focusing control by the phase difference AF method and is larger than the second subject area.

14. The focusing control method according to claim 12, wherein, in the focusing control step, a difference between a width of the second subject area in a first direction and a width of the first subject area in the first direction is set to be greater than a difference between a width of the second subject area in a second direction perpendicular to the first direction and a width of the first subject area in the second direction.

15. The focusing control method according to claim 13, wherein, in the focusing control step, a difference between a width of the second subject area in a first direction and a width of the first subject area in the first direction is set to be greater than a difference between a width of the second subject area in a second direction perpendicular to the first direction and a width of the first subject area in the second direction.

16. The focusing control method according to claim 14, further comprising:
a detection step of detecting a direction of gravity,
wherein, in the focusing control step, the first subject area is set with a direction perpendicular to the direction of gravity as the first direction.

17. The focusing control method according to claim 15, further comprising:
a detection step of detecting a direction of gravity,
wherein, in the focusing control step, the first subject area is set with a direction perpendicular to the direction of gravity as the first direction.

18. A focusing control method comprising:
a focusing control step of selectively performing focusing control by a phase difference AF method using a result of a correlation operation of detection signals of first signal detection parts that detect signals corresponding to one of a pair of luminous fluxes passed through different portions of a pupil area of an imaging optical system and detection signals of second signal detection parts that detect signals corresponding to other one of the pair of luminous fluxes or focusing control by a contrast AF method using contrast of a captured image captured by an imaging element that images a subject through the imaging optical system, in a case where focusing control for focusing on a main subject by driving a focus lens of the imaging optical system including the focus lens is continuously performed multiple times; and a detection step of detecting a direction of gravity, wherein, in the focusing control step, the focusing control by the contrast AF method is performed in a case where a state in which a degree of reliability of the focusing control by the phase difference AF method is equal to or less than a threshold value persists N times, N being a natural number of 2 or more, while the focusing control by the phase difference AF method is continuously performed, in the focusing control step, a first subject area to be in focus in a case where the focusing control by the contrast AF method is performed is set to be an area which includes a second subject area to be in focus in the focusing control by the phase difference AF method and is larger than the second subject area, in the focusing control step, a difference between a width of the second subject area in a first direction and a width of the first subject area in the first direction is set to be greater than a difference between a width of the second subject area in a second direction perpendicular to the first direction and a width of the first subject area in the second direction, and in the focusing control step, the first subject area is set with a direction perpendicular to the direction of gravity as the first direction.

19. A computer readable non-transitory storage medium storing a focusing control program causing a computer to perform:

a focusing control step of selectively performing focusing control by a phase difference AF method using a result of a correlation operation of detection signals of first signal detection parts that detect signals corresponding to one of a pair of luminous fluxes passed through different portions of a pupil area of an imaging optical system and detection signals of second signal detection parts that detect signals corresponding to other one of the pair of luminous fluxes or focusing control by a contrast AF method using contrast of a captured image captured by an imaging element that images a subject through the imaging optical system, in a case where focusing control for focusing on a main subject by driving a focus lens of the imaging optical system including the focus lens is continuously performed multiple times, wherein, in the focusing control step, the focusing control by the contrast AF method is performed in a case where a state in which a degree of reliability of the focusing control by the phase difference AF method is equal to or less than a threshold value persists N times, N being a natural number of 2 or more, while the focusing control by the phase difference AF method is continuously performed, and in the focusing control step, the focusing control by the contrast AF method is performed in a case where the state in which the degree of reliability is equal to or less than the threshold value persists less than N times and an elapsed time after the degree of reliability is equal to or less than the threshold value reaches a time threshold value while the focusing control by the phase difference AF method is continuously performed.

20. A computer readable non-transitory storage medium storing a focusing control program causing a computer to perform:

a focusing control step of selectively performing focusing control by a phase difference AF method using a result of a correlation operation of detection signals of first signal detection parts that detect signals corresponding to one of a pair of luminous fluxes passed through different portions of a pupil area of an imaging optical system and detection signals of second signal detection parts that detect signals corresponding to other one of the pair of luminous fluxes or focusing control by a contrast AF method using contrast of a captured image captured by an imaging element that images a subject through the imaging optical system, in a case where focusing control for focusing on a main subject by driving a focus lens of the imaging optical system including the focus lens is continuously performed multiple times; and a detection step of detecting a direction of gravity, wherein, in the focusing control step, the focusing control by the contrast AF method is performed in a case where a state in which a degree of reliability of the focusing control by the phase difference AF method is equal to or less than a threshold value persists N times, N being a natural number of 2 or more, while the focusing control by the phase difference AF method is continuously performed, in the focusing control step, a first subject area to be in focus in a case where the focusing control by the contrast AF method is performed is set to be an area which includes a second subject area to be in focus in the focusing control by the phase difference AF method and is larger than the second subject area, in the focusing control step, a difference between a width of the second subject area in a first direction and a width of the first subject area in the first direction is set to be greater than a difference between a width of the second subject area in a second direction perpendicular to the first direction and a width of the first subject area in the second direction, and in the focusing control step, the first subject area is set with a direction perpendicular to the direction of gravity as the first direction.

* * * * *